US011418668B2

(12) United States Patent
Ogasawara et al.

(10) Patent No.: US 11,418,668 B2
(45) Date of Patent: Aug. 16, 2022

(54) IMAGE FORMING SYSTEM, IMAGE FORMING APPARATUS, AND INFORMATION PROCESSING APPARATUS

(71) Applicant: Konica Minolta, Inc., Tokyo (JP)

(72) Inventors: Sayaka Ogasawara, Hino (JP); Hiroyuki Konishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/317,758

(22) Filed: May 11, 2021

(65) Prior Publication Data
US 2021/0368053 A1 Nov. 25, 2021

(30) Foreign Application Priority Data

May 25, 2020 (JP) .............. JP2020-090209

(51) Int. Cl.
G06K 15/00 (2006.01)
H04N 1/00 (2006.01)
G06N 20/00 (2019.01)

(52) U.S. Cl.
CPC ......... H04N 1/00779 (2013.01); G06N 20/00 (2019.01); H04N 1/00623 (2013.01); H04N 1/00708 (2013.01); H04N 1/00724 (2013.01); H04N 1/00726 (2013.01); H04N 1/00766 (2013.01); H04N 1/00771 (2013.01)

(58) Field of Classification Search
CPC ............... G06N 20/00; H04N 1/00779; H04N 1/00771; H04N 1/00766; H04N 1/00726; H04N 1/00724; H04N 1/00708; H04N 1/00623
See application file for complete search history.

(56) References Cited

U.S. PATENT DOCUMENTS

2015/0071658 A1* 3/2015 Hoshi .................... G01N 21/21
356/445

FOREIGN PATENT DOCUMENTS

JP 2016-101712 A 6/2016
JP 2016-107442 A 6/2016
JP 2016101712 A * 6/2016

* cited by examiner

Primary Examiner — Moustapha Diaby
(74) Attorney, Agent, or Firm — Squire Patton Boggs (US) LLP

(57) ABSTRACT

An image forming system includes: an image forming apparatus; and a recording material information detecting apparatus provided outside the image forming apparatus, wherein the recording material information detecting apparatus includes a recording material information detector that detects recording material information about a recording material, and the image forming apparatus includes: an image former; an operation detector; and a hardware processor.

17 Claims, 11 Drawing Sheets

| PAPER TYPE | BASIS WEIGHT |
|---|---|
| PLAIN PAPER | 64 TO 74g |

(2)

SHEET INFORMATION MANAGEMENT TABLE (SHEET PROFILE)

| SHEET No. | SHEET PROFILE | SHEET SIZE | SHEET TYPE | BASIS WEIGHT | FRONT AND BACK ADJUSTMENT |
|---|---|---|---|---|---|
| 1 | MEDIA A | A4 | PLAIN PAPER | 64 TO 74g | N/A |
| 2 | MEDIA B | A3 | COATED PAPER | 257 TO 300g | N/A |
| 3 | MEDIA C | A4 | PLAIN PAPER | 106 TO 135g | N/A |
| 4 | | | | | |
| 5 | | | | | |
| 6 | | | | | |
| 7 | | | | | |

(3)

SHEET FEED TRAY OPEN/CLOSE INFORMATION MANAGEMENT TABLE

| No | SHEET FEED TRAY No. |
|---|---|
| 1 | TRAY 1 |
| 2 | TRAY 2 |
| 3 | TRAY 3 |
| 4 | TRAY 4 |
| 5 | |
| 6 | |
| 7 | |
| 8 | |

(4)

| MACHINE CONDITION | JOB LIST | READ | SAVE | COPY | SCAN |
|---|---|---|---|---|---|

TRAY SETTINGS

| TRAY No. | SHEET PROFILE | SHEET SIZE | SHEET TYPE | BASIS WEIGHT | FRONT AND BACK ADJUSTMENT |
|---|---|---|---|---|---|
| TRAY 1 | MEDIA A | A4 | PLAIN PAPER | 64 TO 74g | N/A |
| TRAY 2 | MEDIA B | A3 | COATED PAPER | 257 TO 300g | N/A |
| TRAY 3 | MEDIA C | A4 | PLAIN PAPER | 106 TO 135g | N/A |
| TRAY 4 | MEDIA C | A4 | PLAIN PAPER | 106 TO 135g | N/A |
| TRAY 5 | | | | | |
| TRAY 6 | | | | | |
| TRAY 7 | | | | | |
| TRAY 8 | | | | | |

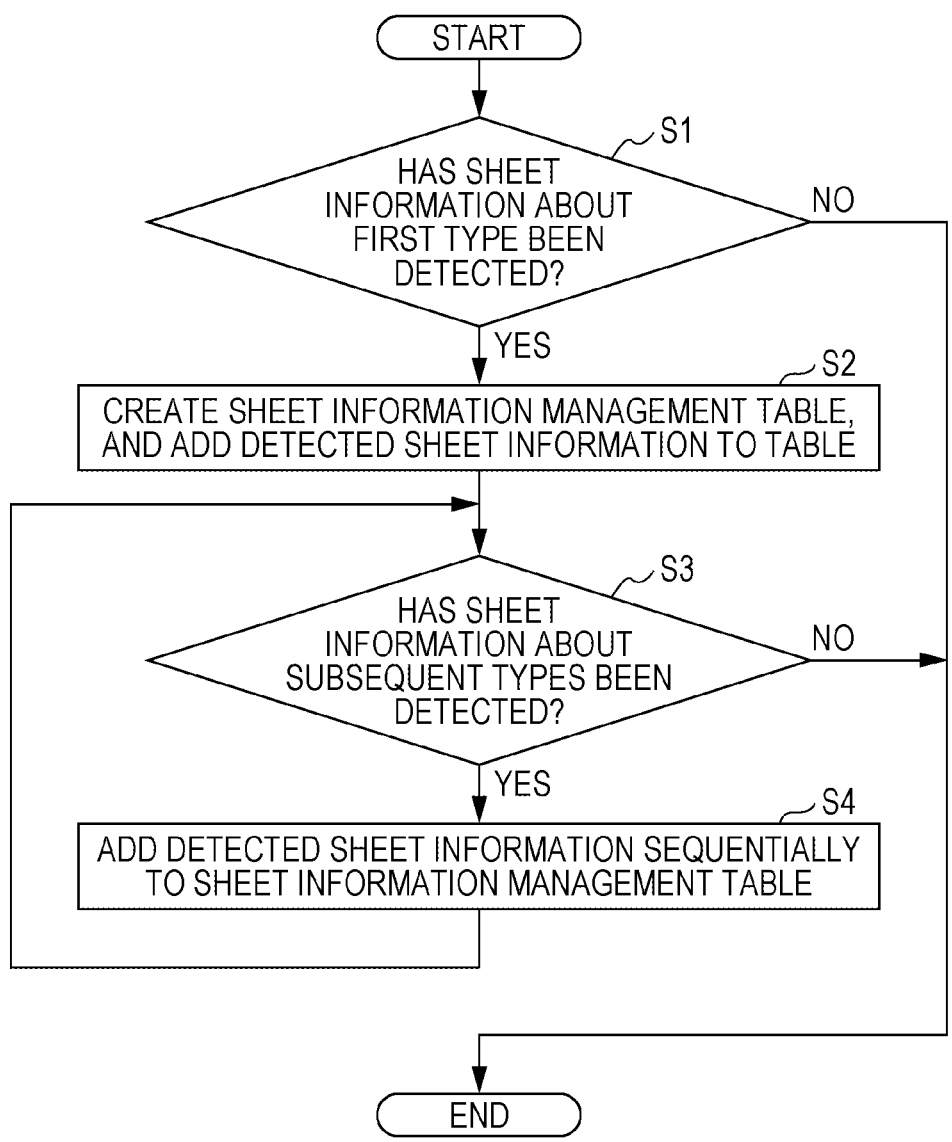

IMAGE FORMING SYSTEM, IMAGE FORMING APPARATUS, AND INFORMATION PROCESSING APPARATUS

The entire disclosure of Japanese patent Application No. 2020-090209, filed on May 25, 2020, is incorporated herein by reference in its entirety.

BACKGROUND

Technological Field

The present invention relates to an image forming system, an image forming apparatus, and an information processing apparatus.

Description of the Related Art

Conventionally, an image forming apparatus is operated according to a workflow in which the user sets paper sheets in sheet feed trays, sets information (sheet types and basis weights) about the paper sheets set in the sheet feed trays through an operation screen, and starts a job. Also, to simplify the series of operations and cope with various types of paper sheets, the results of measurement of the sheet information with an in-line media detection apparatus provided in the conveyance path in the image forming apparatus, or the results of measurement of the sheet information with an offline media detection apparatus provided outside the image forming apparatus are set on the sheet feed trays, according to known techniques.

JP 2016-101712 A discloses a technique by which a registration screen compatible with each of the sheet feed trays from which transition from an open state to a closed state has been detected is displayed on a display, and common attribute information is collectively associated with collective registration target trays and is collectively registered therein, in accordance with an instruction from the user.

Further, J P 2016-107442 A discloses a technique by which a bar code printed on the wrapping paper of paper sheets is read with a bar code reader (or an offline media detection sensor), and the sheet information corresponding to the bar code is set on the sheet feed tray or is automatically set on the sheet feed tray.

In a case where the technique disclosed in JP 2016-101712 A is used, when the user opens and closes a sheet feed tray, a registration screen for sheet feed tray setting is displayed, but the user has to take the trouble of setting sheet information on each sheet feed tray. Also, to set a plurality of pieces of sheet information on a plurality of sheet feed trays, the user need to repeat the process of setting sheet information every time opening and closing a sheet feed tray. Further, when the user opens a plurality of sheet feed trays at once, it takes time and effort to perform setting while checking which sheet information is to be set on the screen of which sheet feed tray.

In a case where the user requests that a plurality of paper sheets be set in a sheet feed tray by using the technique disclosed in JP 2016-107442 A, it is necessary to repeat the process of setting sheet information on the sheet feed tray after causing a bar code reader to detect a bar code each time, which is time-consuming.

Furthermore, J P 2016-107442 A does not disclose any method for the user to register sheet information on a plurality of sheet feed trays at once.

Even in a case where the manual input technique disclosed in JP 2016-101712 A is combined with the sheet reading means disclosed in JP 2016-107442 A, the abovementioned problem of the necessity to repeat information acquisition and setting has not been solved. Further, if the user replaces the paper sheets taken out of the wrapping paper with some other material or the like, it is impossible to identify the sheet information about these paper sheets without the wrapping paper.

SUMMARY

The present invention has been made in view of such circumstances, and aims to correctly set sheet information on sheet feed trays to be used as recording material suppliers, for example.

To achieve the abovementioned object, according to an aspect of the present invention, an image forming system reflecting one aspect of the present invention comprises: an image forming apparatus; and a recording material information detecting apparatus provided outside the image forming apparatus, wherein the recording material information detecting apparatus includes a recording material information detector that detects recording material information about a recording material, and the image forming apparatus includes: an image former that forms an image on the recording material; an operation detector that detects an operation performed on a recording material supplier that supplies the recording material to the image former; a memory; and a hardware processor that causes the memory to store the recording material information set and associated with each recording material supplier of a plurality of the recording material suppliers from which the operation has been detected, in an order in which the operation detector has detected the operation performed on the plurality of the recording material suppliers, in accordance with an order in which the recording material information detector has detected a plurality of pieces of the recording material information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is diagrams showing examples of tables and display screens created by operations according to the first embodiment of the present invention;

FIG. 6 is a flowchart showing an example process in which the media detection apparatus according to the first embodiment of the present invention manages sheet information;

DETAILED DESCRIPTION OF EMBODIMENTS

Figure 1:
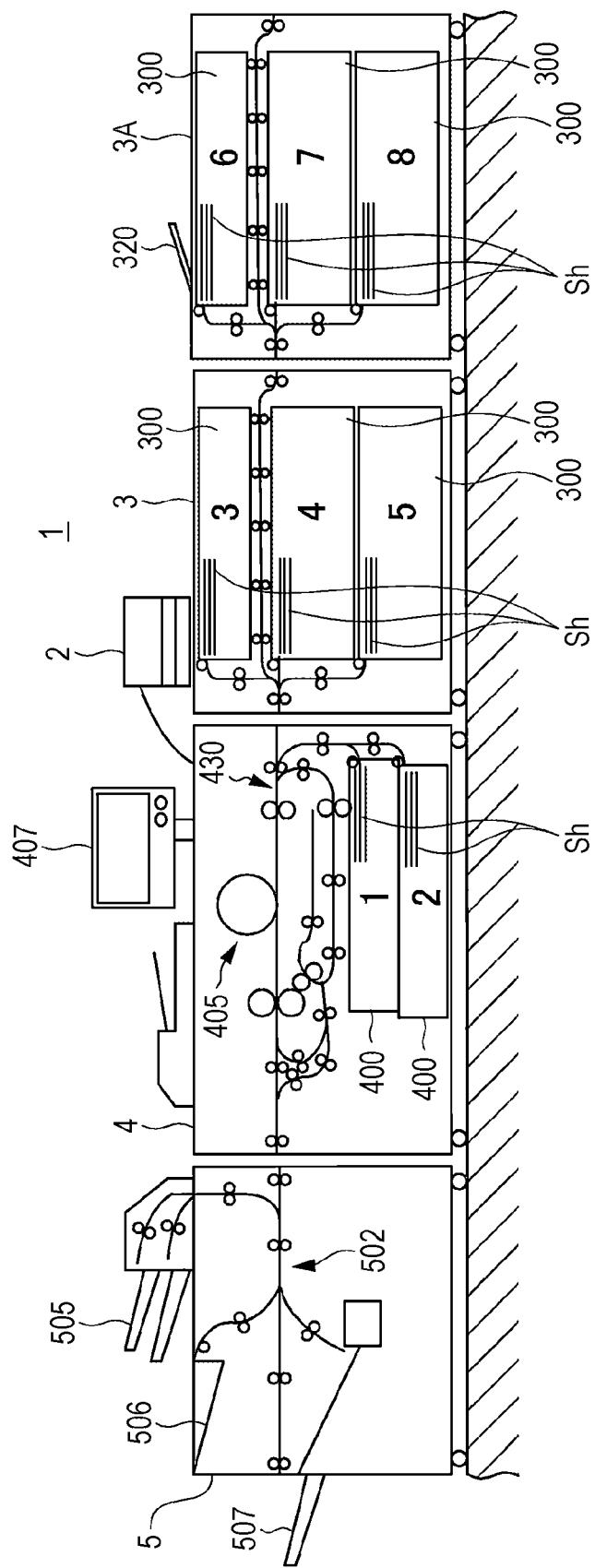
FIG. 1 is a diagram showing the overall configuration of an image forming system according to a first embodiment of the present invention.

Hereinafter, one or more embodiments of the present invention will be described with reference to the drawings. However, the scope of the invention is not limited to the disclosed embodiments. In this specification and the drawings, components having substantially the same functions or structures are denoted by the same reference numerals, and the same explanation is not repeated.

First Embodiment

Figure 2:
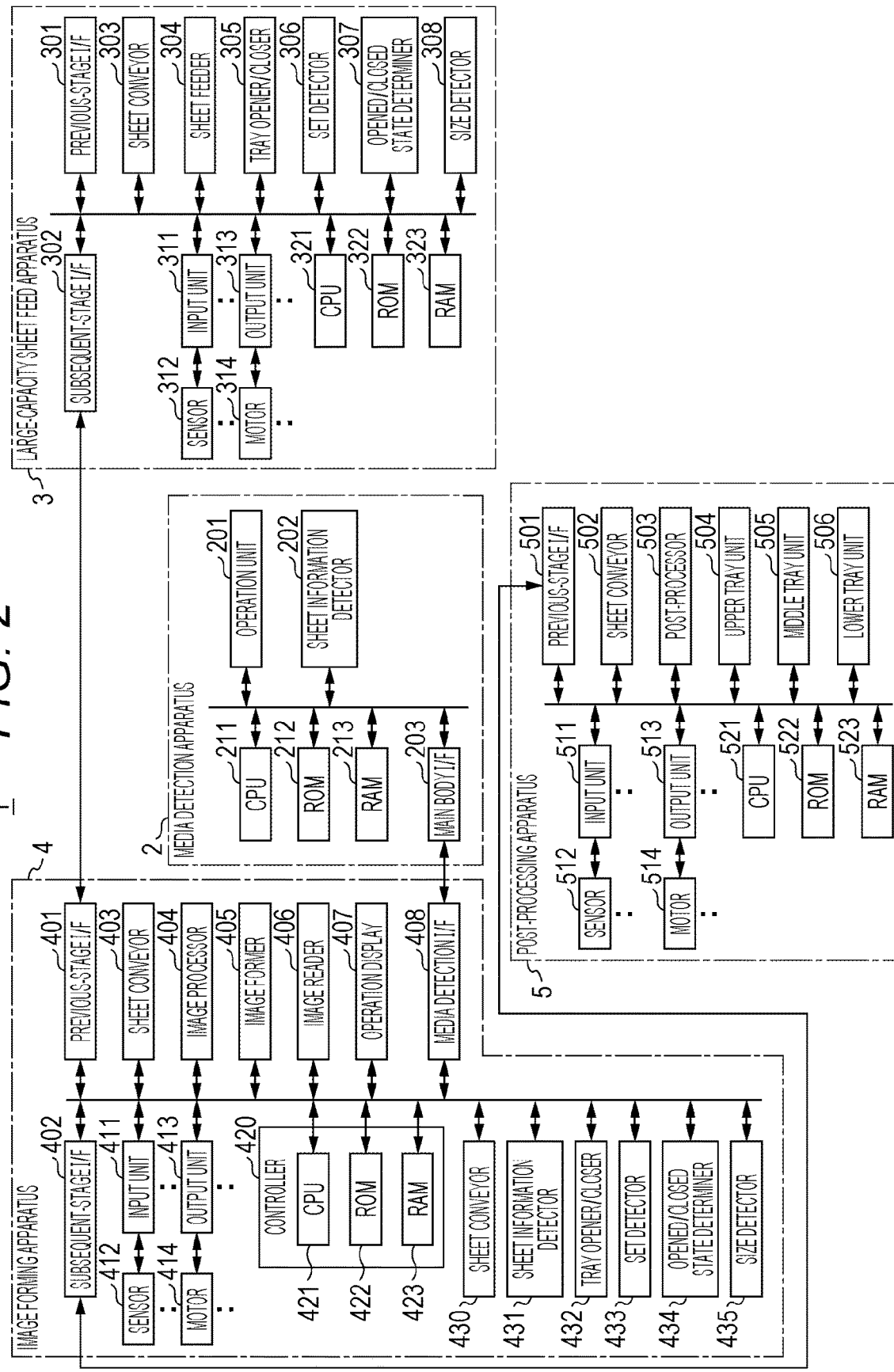
FIG. 2 is a block diagram showing example internal configurations of the respective apparatuses constituting the image forming system according to the first embodiment of the present invention.

First, an example configuration of an image forming system according to a first embodiment of the present invention is described, with reference to FIGS. 1 and 2.

FIG. 1 is an overall configuration diagram of an image forming system 1.

FIG. 2 is a block diagram showing an example internal configuration of each of the apparatuses constituting the image forming system 1.

The image forming system 1 includes a media detection apparatus 2, large-capacity sheet feed apparatuses 3 and 3A, an image forming apparatus 4, and a post-processing apparatus 5. In this embodiment, the image forming system 1 includes the two large-capacity sheet feed apparatuses 3 and 3A, but may include only one large-capacity sheet feed apparatus 3.

As shown in FIG. 1, the large-capacity sheet feed apparatuses 3 and 3A each include three sheet feed trays 300 (an example of a recording material storage). Each sheet feed tray 300 can store a large number of paper sheets Sh (an example of recording materials, also called "media"). The sheet feed trays 300 are connected to the image forming apparatus 4. The media detection apparatus 2 (an example of a recording material information detecting apparatus) that detects sheet information about the paper sheets Sh is installed on an upper portion of the large-capacity sheet feed apparatus 3. The large-capacity sheet feed apparatuses 3 and 3A are connected to the image forming apparatus 4 so as to be able to feed the paper sheets Sh into the image forming apparatus 4. A manual feed tray 320 is provided on an upper portion of the large-capacity sheet feed apparatus 3A. When the user manually inserts several paper sheets Sh into the manual feed tray 320, the paper sheets Sh are conveyed in the conveyance path extending through the large-capacity sheet feed apparatuses 3A and 3, and the image forming apparatus 4 in this order.

The media detection apparatus 2 is disposed outside the image forming apparatus 4, and is connected to the image forming apparatus 4 via a communication cable (not shown). The image forming apparatus 4 also includes two sheet feed trays 400 (an example of a recording material storage). Each sheet feed tray 400 can store paper sheets Sh. These sheet feed trays 400 are contained in the image forming apparatus 4. As shown in FIG. 1, sheet feed tray numbers "1" to "8" are assigned so that each of the sheet feed trays 300 and 400 can be identified. Therefore, in the description below, the sheet feed trays 300 and 400 may be referred to simply as the sheet feed tray 1, the sheet feed tray 2, and the like, according to the sheet feed tray numbers. Further, when the sheet feed trays 1 to 8 are not distinguished from one another, they may be referred to simply as the "sheet feed trays".

The post-processing apparatus 5 performs predetermined post-processing on a paper sheet Sh that has an image formed thereon. Types of post-processing include side stitching, saddle stitching, perforation, and center folding, for example. The post-processed paper sheet Sh is discharged onto an upper tray unit 504, a middle tray unit 505, or a lower tray unit 506.

<Example Configuration of a Large-Capacity Sheet Feed Apparatus>

Next, an example internal configuration of the large-capacity sheet feed apparatus 3 is described, with reference to FIG. 2. However, since the large-capacity sheet feed apparatuses 3 and 3A have the same configuration, FIG. 2 focuses only on the large-capacity sheet feed apparatus 3, and an example internal configuration of the large-capacity sheet feed apparatus 3 is now described with reference to FIG. 2.

The large-capacity sheet feed apparatus 3 includes a previous-stage interface (I/F) 301, a subsequent-stage I/F 302, a sheet conveyor 303, a sheet feeder 304, a tray opener/closer 305, a set detector 306, an opened/closed state determiner 307, a size detector 308, input units 311, sensors 312, output units 313, motors 314, a central processing unit (CPU) 321, a read only memory (ROM) 322, and a random access memory (RAM) 323.

The previous-stage I/F 301 and the subsequent-stage I/F 302 are communication interfaces that enable a plurality of large-capacity sheet feed apparatuses 3 and 3A to communicate with each other. The previous-stage I/F 301 of the large-capacity sheet feed apparatus 3 is connected to the subsequent-stage I/F 302 of the large-capacity sheet feed apparatus 3A via a communication cable, for example. Meanwhile, the subsequent-stage I/F 302 of the large-capacity sheet feed apparatus 3 is connected to a previous-stage I/F 401 of the image forming apparatus 4 via a communication cable.

The sheet conveyor 303 conveys the paper sheets Sh stored in the sheet feed trays 300 to the subsequent apparatus one by one. As shown in FIG. 1, the paper sheets Sh fed from the sheet feed trays 300 of the large-capacity sheet feed apparatuses 3 and 3A are conveyed to the subsequent apparatus by the sheet conveyor 303. In this embodiment, an example in which the paper sheets Sh are used as recording materials is described, but other various kinds of materials such as film or cloth can also be used as recording materials.

The sheet feeder 304 (an example of a recording material supplier) feeds the paper sheets Sh from the sheet feed trays 300 in which the paper sheets Sh are stored to an image former 405 of the image forming apparatus 4 via the sheet conveyor 303.

The tray opener/closer 305 opens/closes the sheet feed trays 300 by an autoloading technique or the like. A tray opener that only opens the sheet feed trays 300 may be provided. The tray opener/closer 305 and the tray opener are both used as an example of a storage opener.

The set detector 306 detects whether the paper sheets Sh are set in the sheet feed trays 300, or detects whether the paper sheets Sh set in the sheet feed trays 300 are in the correct orientation.

The opened/closed state determiner 307 determines opened/closed states of the sheet feed trays 300, the opened/closed states indicating whether the sheet feed trays 300 are in an opened state or a closed state.

The size detector 308 is provided for each sheet feed tray 300, and detects the sizes of the paper sheets Sh set in the sheet feed trays 300.

Information detected by the tray opener/closer 305, the set detector 306, and the opened/closed state determiner 307 is output to the CPU 321, and is further transmitted to a controller 420 of the image forming apparatus 4.

Detection information is input to the input units 311 from various sensors 312 installed in the large-capacity sheet feed apparatus 3. The detection information is written into the RAM 323, is referred to by the CPU 321 as appropriate, and is used for processing.

The output units 313 output drive instructions to the various motors 314 installed in the large-capacity sheet feed apparatus 3. The motors 314 are driven under the control of the sheet conveyor 303, for example, to take out paper sheets Sh from the sheet feed trays 300 and perform sheet conveyance.

The CPU 321 reads, from the ROM 322, the program codes of the software for achieving the respective functions of the large-capacity sheet feed apparatus 3 according to this embodiment, loads the program codes into the RAM 323, and executes them. Variables, parameters, and the like that are generated during the arithmetic processing by the CPU 321 are temporarily written into the RAM 323, and these variables, parameters, and the like are read by the CPU 321 as appropriate. In this manner, the ROM 322 records the programs, data, and the like necessary for the CPU 321 to operate, and is used as an example of a computer-readable non-transient recording medium storing the programs to be executed by a computer that operates the large-capacity sheet feed apparatus 3.

<Example Configuration of the Media Detection Apparatus>

An example configuration of the media detection apparatus 2 is now described.

Figure 3:
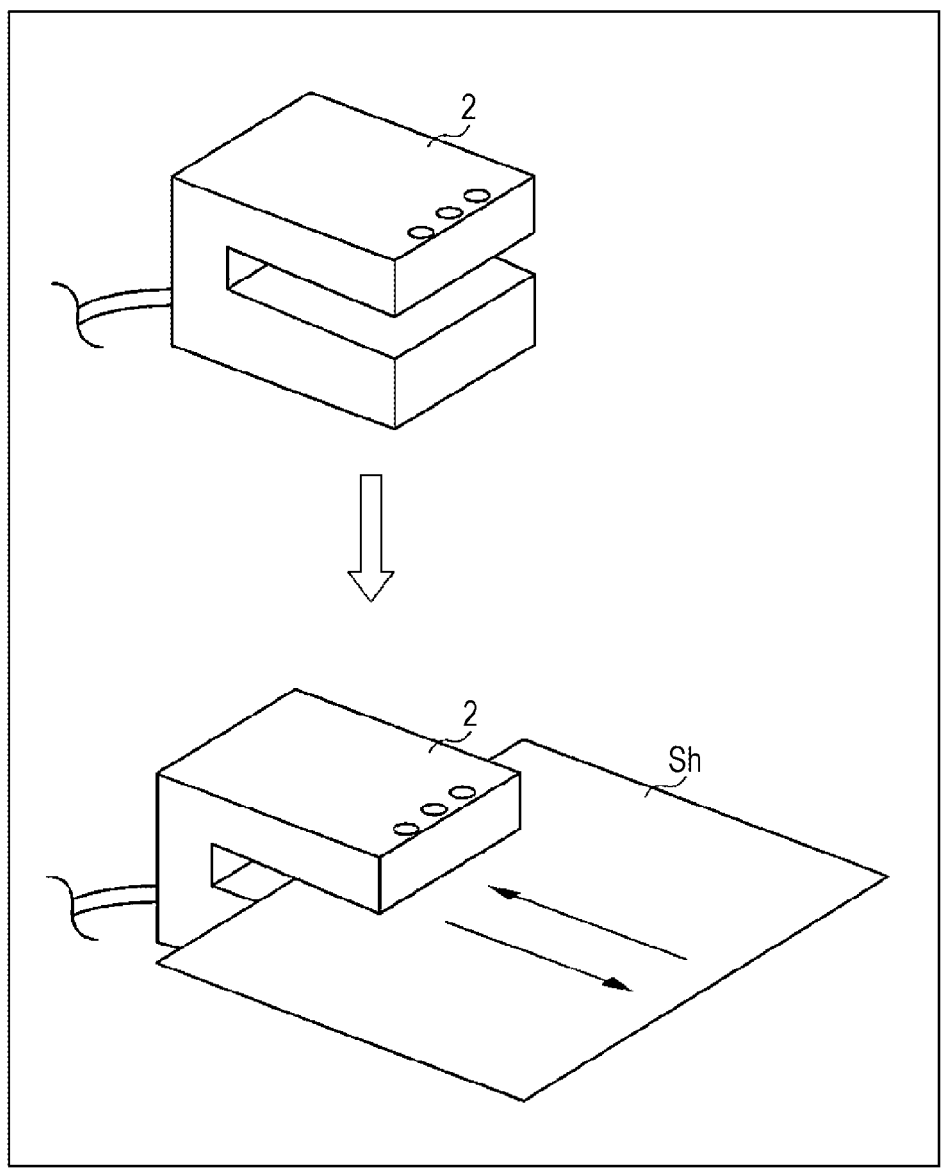
FIG. 3 is an external perspective view showing an example configuration of a media detection apparatus according to the first embodiment of the present invention.

FIG. 3 is an external perspective view showing an example configuration of the media detection apparatus 2.

As shown in FIG. 1, the media detection apparatus 2 is disposed outside the image forming apparatus 4, and is connected to the image forming apparatus 4 via a communication cable. Further, the media detection apparatus 2 is disposed outside the sheet feed trays.

As shown in the upper half of FIG. 3, the media detection apparatus 2 has a substantially U-shaped cross-section. In this manner, the media detection apparatus 2 has a recess into which the user can insert at least part of a paper sheet Sh.

As shown in the lower half of FIG. 3, when the user inserts a paper sheet Sh into the recess of the media detection apparatus 2, the media detection apparatus 2 detects sheet information (an example of recording material information) regarding the paper sheet Sh inserted in the recess. The media detection apparatus 2 detects physical property values of the paper sheet Sh as the sheet information. The paper sheet Sh from which the sheet information is to be detected is set in one of the sheet feed trays 1 to 8 after the user causes the media detection apparatus 2 to detect the sheet information.

As the user puts the paper sheet Sh in and out of the media detection apparatus 2, the media detection apparatus 2 detects the sheet information about the paper sheet Sh. The media detection apparatus 2 then transmits the sheet information to the image forming apparatus 4. This sheet information includes at least one piece of information among physical property values obtained by measuring physical property values of the paper sheet Sh, such as the basis weight and the water content of the paper sheet Sh, sheet type indicating the type of the paper sheet Sh, such as cardboard, and detection values obtained by measuring the shape and the like of the paper sheet Sh, for example. The sheet information may be handled as information represented by a signal corresponding to the sheet information.

The media detection apparatus 2 includes a sheet information detector 202 (see FIG. 2) formed with a sensor (not shown) provided in the media detection apparatus 2. The sheet information detector 202 transmits the sheet information about the paper sheet Sh obtained from the electrical values detected by inserting the paper sheet Sh into the recess of the media detection apparatus 2, to the image forming apparatus 4. The image forming apparatus 4 then determine the sheet information such as the sheet type, the basis weight, and the water content of the paper sheet Sh, on the basis of the sheet information received from the media detection apparatus 2.

Referring back to FIG. 2, explanation of an example internal configuration of the media detection apparatus 2 is continued.

The media detection apparatus 2 includes an operation unit 201, the sheet information detector 202, a main body I/F 203, a CPU 211, a ROM 212, and a RAM 213.

The operation unit 201 is used in an operation to be performed by the user to input an instruction to the media detection apparatus 2. Through the operation unit 201, the user can input an instruction to turn on or off the power supply to the media detection apparatus 2, or to start detecting sheet information, and the number of paper sheets Sh from which the media detection apparatus 2 is to detect sheet information, for example.

The sheet information detector 202 (an example of a recording material information detector) detects the sheet information about the paper sheet Sh that is fed when the image forming apparatus 4 executes a job. The sheet information detector 202 is formed with sensors including a light emitting element and a light receiving element, for example, and detects the sheet information about the paper sheet Sh inserted into the sheet detection portion by the user. The sheet information to be detected by the sheet information detector 202 includes the sheet type, the rigidity, the basis weight, and the water content of the paper sheet Sh. The sheet information is only required to include at least one piece of information about the sheet type, the rigidity, the basis weight, and the water content.

The main body I/F 203 (an example of a first communication unit) is connected to a media detection I/F 408 of the image forming apparatus 4 via a communication cable, and transmits sheet information corresponding to the sheet information about the paper sheet Sh detected by the sheet information detector 202, to the image forming apparatus 4.

The CPU 211 reads, from the ROM 212, the program codes of the software for achieving the respective functions of the media detection apparatus 2 according to this embodiment, loads the program codes into the RAM 213, and executes them. Variables, parameters, and the like that are generated during the arithmetic processing performed by the CPU 211 are temporarily written into the RAM 213, and these variables, parameters, and the like are read by the CPU 211 as appropriate. In this manner, the ROM 212 records the programs, data, and the like necessary for the CPU 211 to operate, and is used as an example of a computer-readable non-transient recording medium storing the programs to be executed by a computer that operates the media detection apparatus 2.

<Example Configuration of an Image Forming Apparatus>

Next, an example internal configuration of the image forming apparatus 4 is described.

The image forming apparatus 4 includes the previous-stage I/F 401, a subsequent-stage I/F 402, a sheet feeder 403, an image processor 404, the image former 405, an image reader 406, an operation display 407, the media detection I/F 408, a sheet conveyor 430, and a sheet information detector 431.

The previous-stage I/F 401 and the subsequent-stage I/F 402 are communication interfaces for enabling the image forming apparatus 4 to communicate with other apparatuses. The previous-stage I/F 401 of the image forming apparatus 4 is connected to the subsequent-stage I/F 302 of the large-capacity sheet feed apparatus 3 via a communication cable. Meanwhile, the subsequent-stage I/F 402 of the image forming apparatus 4 is connected to a previous-stage I/F 501 of the post-processing apparatus 5 via a communication cable.

The sheet feeder 403 (an example of a recording material supplier) supplies a paper sheet Sh from a sheet feed tray 400 in which paper sheets Sh are stored, to the image former 405 via the sheet conveyor 430.

The image processor 404 performs predetermined image processing such as RIP processing on an image transmitted from a personal computer (PC), a server, or the like (not shown) to the image forming apparatus 4.

The image former 405 forms the image in an electrophotographic manner, for example, on the paper sheet Sh conveyed by the sheet conveyor 430. After the image formation process performed by the image former 405, a fixing unit fixes the image formed on the paper sheet Sh.

The image reader 406 scans the paper sheet Sh, to read the image fixed on the paper sheet Sh. For this reason, the image reader 406 is disposed in a stage after the image former 405. The image read by the image reader 406 is saved in a RAM 423, or is stored into an external large-capacity memory device (not shown).

The operation display 407 is provided for the user to give a job execution instruction and the like to the image forming system 1. The operation display 407 is formed with a touch panel display device disposed on the housing of the image forming apparatus 4. While looking at an operation screen displayed on the operation display 407, the user performs setting for a job, issues a job execution instruction, and sets sheet information on a sheet feed tray, for example. The information supplied through the operation display 407 is input to a CPU 421. Also, the result of processing performed by the CPU 421 is displayed on the operation display 407.

The functions of the operation display 407 may be divided into an operation unit and a display unit.

The media detection I/F 408 (an example of a second communication unit) is connected to the main body I/F 203 of the media detection apparatus 2 via a communication cable, and receives sheet information from the media detection apparatus 2.

The image forming apparatus 4 also includes input units 411, sensors 412, output units 413, and motors 414.

Detection information is input to the input units 411 from the various sensors 412 installed in the image forming apparatus 4. The detection information is written into the RAM 423, is referred to by the CPU 421 as appropriate, and is used for processing.

The output units 413 output drive instructions to the various motors 414 installed in the image forming apparatus 4. The motors 414 are driven under the control of the image former 405, for example, to convey a paper sheet Sh and rotate various drums (not shown).

The image forming apparatus 4 also includes the controller 420 that controls operations of the respective components in the image forming apparatus 4. The controller 420 causes the RAM 423 to store sheet information associated with the respective sheet feed trays from which operations have been detected, in the order in which operations performed on the sheet feed trays were detected by an operation detector 441 in accordance with the order in which a plurality of pieces of sheet information was detected by the sheet information detector 202. This controller 420 is capable of accepting a batch registration mode for collectively registering a plurality of pieces of sheet information in a plurality of sheet feed trays. When accepting the batch registration mode, the controller 420 sets the sheet information detected by the sheet information detector 202 on the sheet feed trays detected by the operation detector 441.

This controller 420 is formed with combinations of the functions achieved by the CPU 421, a ROM 422, and the RAM 423. The CPU 421 reads, from the ROM 422, the program codes of the software for achieving the respective functions of the image forming apparatus 4 according to this embodiment, loads the program codes into the RAM 423, and executes them. Variables, parameters, and the like that are generated during the arithmetic processing performed by the CPU 421 are temporarily written into the RAM 423, and these variables, parameters, and the like are read by the CPU 421 as appropriate. In this manner, the ROM 422 records the programs, data, and the like necessary for the CPU 421 to operate, and is used as an example of a computer-readable non-transient recording medium storing the programs to be executed by a computer that operates the image forming apparatus 4.

The sheet information detector 431 is an in-line sensor provided in the conveyance path for the paper sheets Sh in the image forming apparatus 4, for example, and can detect the sheet information about the paper sheet Sh being conveyed.

The image forming apparatus 4 also includes a tray opener/closer 432, a set detector 433, an opened/closed state determiner 434, and a size detector 435 for each sheet feed tray 400.

The tray opener/closer 432 is a mechanism for opening and closing the sheet feed trays 400 by an autoloading technique or the like. A tray opener that only opens the sheet feed trays 400 may be provided. The tray opener/closer 432 and the tray opener are both used as an example of a storage opener.

The set detector 433 detects whether paper sheets Sh are set in the sheet feed trays 400, or detects whether the paper sheets Sh set in the sheet feed trays 400 are in the correct orientation.

The opened/closed state determiner 434 determines opened/closed states of the sheet feed trays 400, the opened/closed states indicating whether the sheet feed trays 400 are in an opened state or a closed state.

The size detector 435 detects the sizes of the paper sheets Sh set in the sheet feed trays 400.

Information detected by the tray opener/closer 432, the set detector 433, the opened/closed state determiner 434, and the size detector 435 is output to the controller 420.

<Example Configuration of the Post-Processing Apparatus>

Next, an example internal configuration of the post-processing apparatus 5 is described.

The post-processing apparatus 5 includes a previous-stage I/F 501, a sheet conveyor 502, a post-processor 503, the upper tray unit 504, the middle tray unit 505, and the lower tray unit 506.

The previous-stage I/F 501 is a communication interface for enabling the post-processing apparatus 5 to communicate with the image forming apparatus 4. The previous-stage I/F 501 is connected to the subsequent-stage I/F 402 of the image forming apparatus 4 via a communication cable.

The sheet conveyor 502 conveys a paper sheet Sh discharged from the image forming apparatus 4. The paper sheet Sh is conveyed to the upper tray unit 504, the middle tray unit 505, or the lower tray unit 506. Further, various kinds of post-processing are performed by the post-processor 503 during the conveyance of the paper sheet Sh.

For example, the post-processor 503 performs post-processing, such as side stitching, saddle stitching, perforation, and center folding, on the paper sheet Sh.

Paper sheets Sh having print defects are discharged onto the upper tray unit 504 and the middle tray unit 505. Ejection destinations of the paper sheets Sh vary depending on the types of print defects.

Paper sheets Sh on which preferred printing has been performed are discharged onto the lower tray unit 506.

The post-processing apparatus 5 also includes input units 511, sensors 512, output units 513, motors 514, a CPU 521, a ROM 522, and a RAM 523.

Detection information is input to the input units 511 from the various sensors 512 installed in the post-processing apparatus 5. The detection information is written into the RAM 523, is referred to by the CPU 521 as appropriate, and is used for processing.

The output units 513 output drive instructions to the various motors 514 installed in the post-processing apparatus 5. The motors 514 are driven under the control of the sheet conveyor 502, for example, to convey paper sheets Sh and drive the post-processor 503.

The CPU 521 reads, from the ROM 522, the program codes of the software for achieving the respective functions of the post-processing apparatus 5 according to this embodiment, loads the program codes into the RAM 523, and executes them. Variables, parameters, and the like that are generated during the arithmetic processing performed by the CPU 521 are temporarily written into the RAM 523, and these variables, parameters, and the like are read by the CPU 521 as appropriate. In this manner, the ROM 522 records the programs, data, and the like necessary for the CPU 521 to operate, and is used as an example of a computer-readable non-transient recording medium storing the programs to be executed by a computer that operates the post-processing apparatus 5.

<Example Functional Configurations of the Media Detection Apparatus and the Image Forming Apparatus>

Attention is now paid to the relationship between the media detection apparatus 2 and the image forming apparatus 4.

Figure 4:
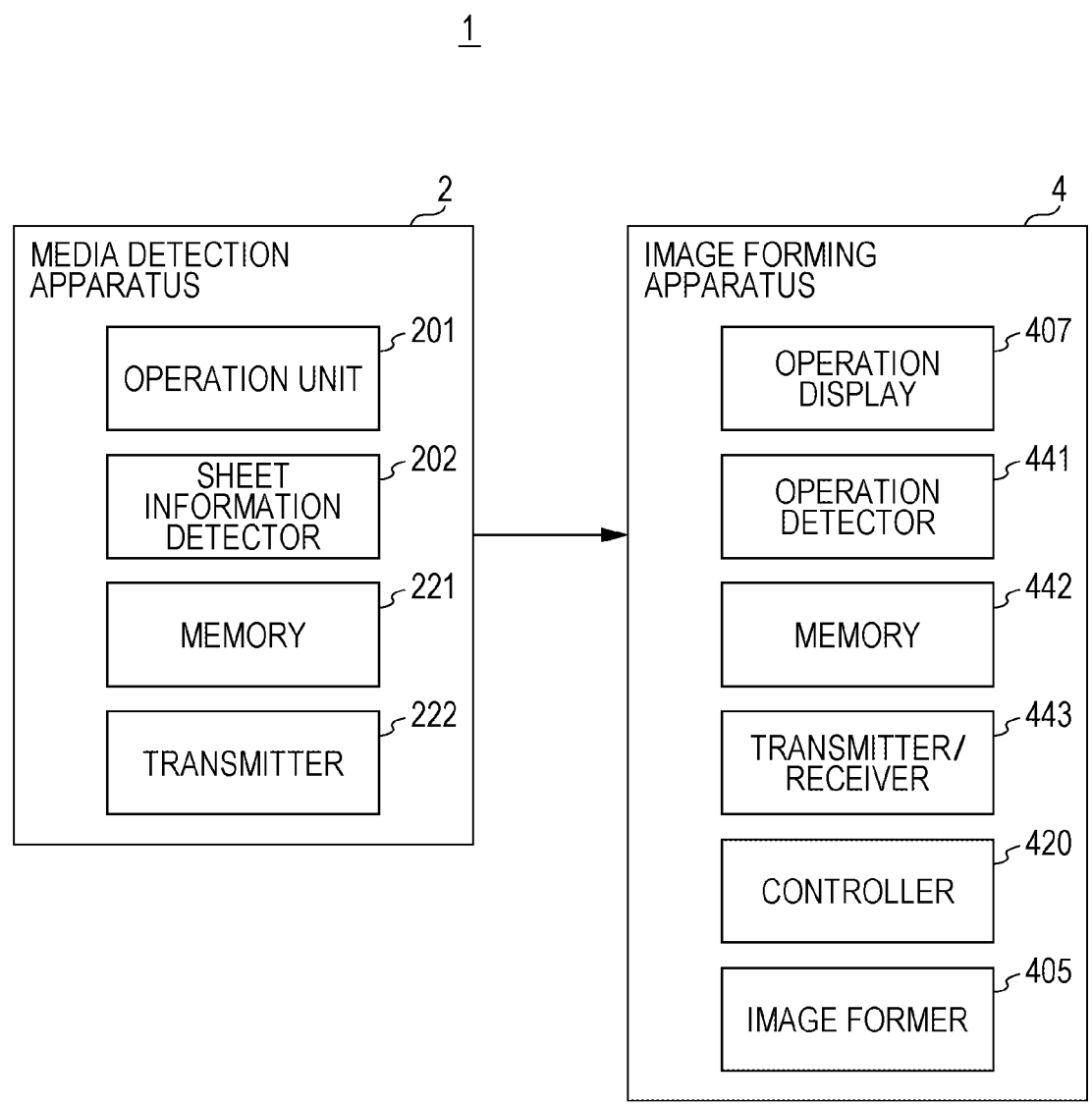
FIG. 4 is a block diagram showing example functional configurations of the media detection apparatus and an image forming apparatus according to the first embodiment of the present invention.

FIG. 4 is a block diagram showing example functional configurations of the media detection apparatus 2 and the image forming apparatus 4. In FIG. 4, the blocks necessary for explaining processing according to this embodiment are extracted from the block diagram shown in FIG. 2, and the relationship between the media detection apparatus 2 and the image forming apparatus 4 is shown in an easy-to-understand manner.

The media detection apparatus 2 includes a memory 221 and a transmitter 222, in addition to the operation unit 201 and the sheet information detector 202 shown in FIG. 2.

The respective functions of the operation unit 201 and the sheet information detector 202 are as described above with reference to FIG. 2.

The functions of the memory 221 are formed by the RAM 213, for example. The memory 221 stores the sheet information about paper sheets Sh detected by the sheet information detector 202.

The functions of the transmitter 222 are formed by the main body I/F 203 shown in FIG. 2. The transmitter 222 transmits the sheet information about the paper sheets Sh stored in the memory 221, to the image forming apparatus 4.

The image forming apparatus 4 includes the operation display 407, the operation detector 441, a memory 442, a transmitter/receiver 443, the controller 420, and the image former 405.

The respective functions of the operation display 407, the controller 420, and the image former 405 are as described above with reference to FIG. 2.

The controller 420 determines various matters related to image formation to be performed in the image forming system 1, and controls operations of the respective components in the image forming system 1. For example, the controller 420 controls driving of the image former 405, driving of the sheet conveyor 430 formed with conveyance rollers provided in the conveyance path, driving of the pickup rollers provided in the sheet feed trays, and the like.

The operation detector 441 detects a user operation that is part of the processing performed by the CPU 421, and is performed on a sheet feed tray that supplies paper sheets Sh to the image former 405, on the basis of information acquired from the transmitter/receiver 443. The user operation may be an operation in which the user opens and closes a sheet feed tray, an operation in which the user opens a sheet feed tray, or an operation in which the user designates a sheet feed tray, for example. Further, if a sheet feed tray has an autoloading mechanism, the user operation may be an operation in which the user presses an open button for opening the sheet feed tray. Information indicating these user operations to be performed on a sheet feed tray is used as tray open/close information indicating that the sheet feed tray has been opened or closed. The operation detector 441 creates a sheet feed tray open/close information management table (see FIG. 5 described later) in the memory 442. Further, paper sheets Sh are set in the sheet feed tray from which the operation detector 441 has detected a user operation. Therefore, before setting paper sheets Sh in the sheet feed tray, the user takes out one paper sheet Sh from the bundle of paper sheets, and operates the media detection apparatus 2 to detect the sheet information about the paper sheet Sh.

The memory 442 is formed in the RAM 423, for example, and stores the sheet information of paper sheets Sh detected by the operation detector 441. Various tables shown in FIG. 5, which will be described later, are created in the memory 442.

The functions of the transmitter/receiver 443 are formed by the previous-stage I/F 401, the subsequent-stage I/F 402, and the media detection I/F 408, for example. The transmitter/receiver 443 receives sheet information from the media detection apparatus 2, and receives open/close information about the sheet feed trays of the large-capacity sheet feed apparatuses 3 and 3A, and information indicating that paper sheets Sh are set in the sheet feed trays. The transmitter/receiver 443 also transmits a post-processing instruction set in a job to the post-processing apparatus 5.

<Examples of Conventional Operations>

Next, examples of conventional operations that are performed according to the techniques disclosed in JP 2016-101712 A and JP 2016-107442 A are described.

<Conventional Operation Disclosed in JP 2016-101712 A>

(1) First, in a case where a sheet feed tray is opened and closed, a registration screen is displayed on a touch panel display device.

(2) In a case where a plurality of sheet feed trays is opened and closed after that, a plurality of selection buttons is displayed on the registration screen.

(3) When the user presses a plurality of selection buttons and selects a plurality of sheet feed trays, a registration screen for collectively registering the sheet feed trays selected by the user is displayed.

(4) When the user performs sheet feed tray setting from the registration screen, the sheet information is reflected in all the sheet feed trays selected by the user.

<Conventional Operation Disclosed in JP 2016-107442 A>

(1) First, the user uses a media detection apparatus such as a bar code reader, to read the bar code attached to the wrapping paper that wraps paper sheets, and detect the sheet information about the paper sheets.

(2) Upon receipt of the sheet information from the media detection apparatus, the image forming apparatus then registers the sheet information in a sheet profile in the image forming apparatus.

(3) The user associates the sheet information registered in the sheet profile with the sheet feed tray in which the paper sheets are actually set. Alternatively, the image forming apparatus automatically detects the sheet feed tray that has the same size and has changed its state, and then performs sheet feed tray setting.

In such a conventional operation, it takes time and effort to match information between the sheet feed tray in which the paper sheets are set and the sheet feed tray that reflects the sheet information.

Next, operations according to this embodiment are described, with reference to FIGS. 5 to 8.

FIG. 5 is diagrams showing examples of tables and display screens created by operations according to this embodiment.

As shown in an explanatory diagram (1) in FIG. 5, the user causes the media detection apparatus 2 to detect the sheet information about a paper sheet Sh. According to this sheet information, the sheet type is plain paper, and the basis weight is 64 to 74 g. Explanatory diagrams (2) to (4) in FIG. 5 will be described below in conjunction with a flowchart of each process.

<Example Process to be Performed by the Media Detection Apparatus>

Next, a process to be performed by the media detection apparatus 2 is described.

FIG. 6 is a flowchart showing an example process in which the media detection apparatus 2 manages sheet information.

First, the sheet information detector 202 of the media detection apparatus 2 determines whether the sheet information about paper sheets Sh of a first type has been detected (S1). If the user has not inserted a paper sheet Sh of the first type into the media detection apparatus 2, the sheet information detector 202 does not detect the sheet information (NO in S1), and therefore, this process comes to an end.

If the user has inserted a paper sheet Sh of the first type into the media detection apparatus 2, the sheet information detector 202 detects the sheet information about the paper sheet Sh (YES in S1). Therefore, the sheet information detector 202 creates a sheet information management table (see the explanatory diagram (2) in FIG. 5) for storing the sheet information, and adds the detected sheet information about the paper sheet Sh to the sheet information management table (S2).

The sheet information detector 202 next determines whether the sheet information about paper sheets Sh of second and subsequent types has been detected (S3). If the user has not inserted paper sheets Sh of the second and subsequent types into the media detection apparatus 2, the sheet information detector 202 does not detect the sheet information (NO in S3), and therefore, this process comes to an end.

If the user has inserted a paper sheet Sh of the second type into the media detection apparatus 2, the sheet information detector 202 detects the sheet information about the paper sheet Sh (YES in S3). Therefore, the sheet information detector 202 sequentially adds the detected sheet information to the sheet information management table created in step S2 (S4). The process then returns to step S3, and, when a paper sheet Sh of a third or subsequent type is inserted, the sheet information detector 202 repeats the process of adding the detected sheet information to the sheet information management table.

The explanatory diagram (2) in FIG. 5 shows an example configuration of the sheet information management table (an example of a first table) created by the media detection apparatus 2.

The sheet information management table created in step S2 in FIG. 6 stores a plurality of pieces of sheet information, particularly sheet profiles, which have been collectively detected by the sheet information detector 202 from a plurality of paper sheets Sh at predetermined timing, in order of detection performed by the sheet information detector 202. The predetermined timing may be before the image former 405 executes a job of forming an image on a paper sheet Sh, for example. The sheet information detected by the sheet information detector 202 within a predetermined time from the predetermined timing is then stored into the sheet information management table.

The sheet information management table is created in the memory 221 of the media detection apparatus 2 or in the memory 442 (see FIG. 4) of the image forming apparatus 4. In a case where the sheet information management table is created in the memory 221 of the media detection apparatus 2, the sheet information management table is transmitted from the media detection apparatus 2 to the image forming apparatus 4 in the process of setting sheet information on the sheet feed trays shown in the explanatory diagram (4) in FIG. 5. Although the sheet information management table is deleted after the job is executed, the sheet information management table may be associated with the job and be saved in the memory 442 of the image forming apparatus 4, in preparation for re-execution of the job.

The sheet information management table shown in FIG. 5 is formed with the respective fields for sheet number, sheet profile, sheet size, sheet type, basis weight, and front and back adjustment.

In the sheet number field, the order of detection of paper sheets Sh from which the media detection apparatus 2 has detected the sheet information in accordance with a user instruction is stored.

In the sheet profile field, names and codes for identifying paper sheets Sh, such as "Media A" and "Media B", for example, are stored as the profiles of the paper sheets Sh detected by the media detection apparatus 2.

In the sheet size field, the sheet sizes (A3 and A4, for example) of the paper sheets Sh detected by the media detection apparatus 2 are stored.

In the sheet type field, the sheet types (plain paper and coated paper, for example) of the paper sheets Sh detected by the media detection apparatus 2 are stored.

In the basis weight field, the basis weights (64 to 74 g, and 257 to 300 g, for example) of the paper sheets Sh detected by the media detection apparatus 2 are stored.

In the front and back adjustment field, information ("applicable" or "not applicable", for example) indicating whether adjustment is necessary for the fronts and backs of the paper sheets Sh detected by the media detection apparatus 2 is stored.

<Example of Sheet Feed Tray Open/Close Detection>

Figure 7:
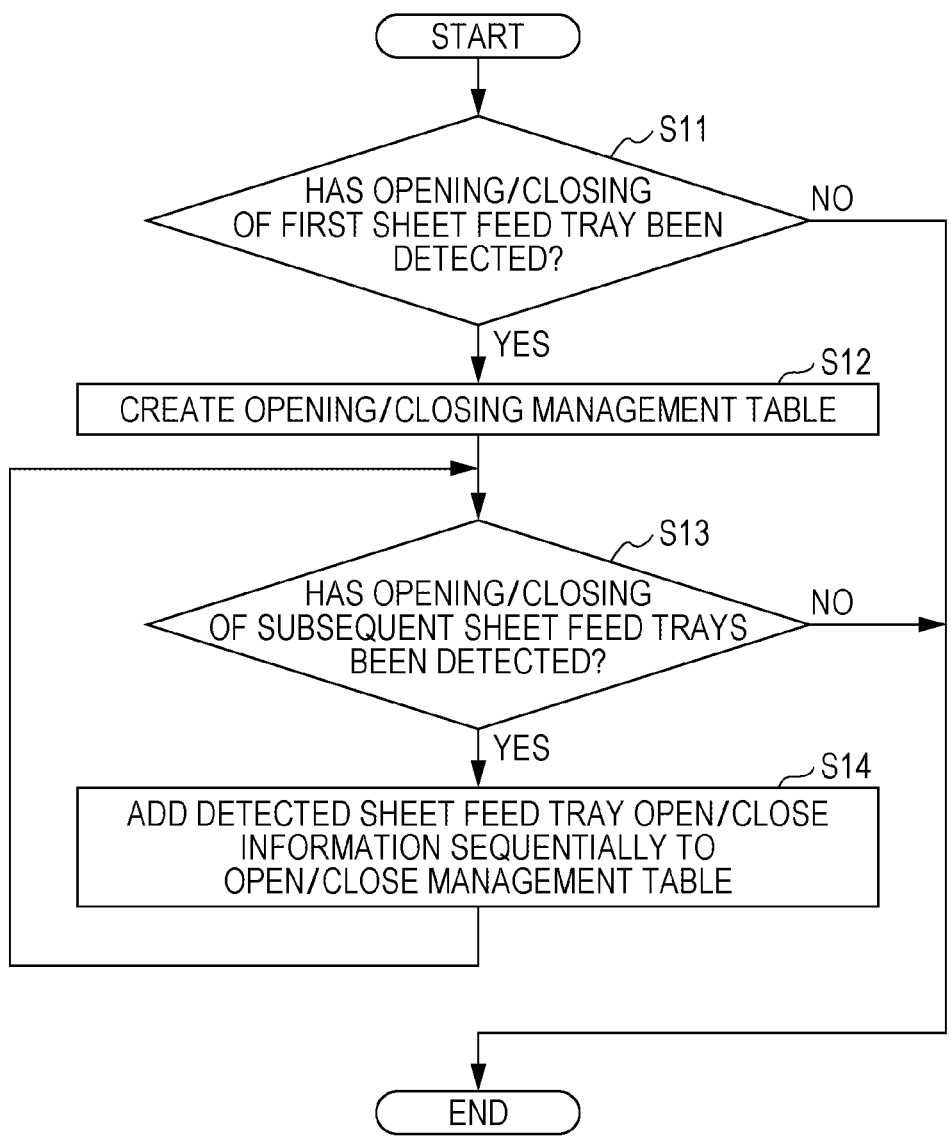
FIG. 7 is a flowchart showing an example process in which the image forming apparatus according to the first embodiment of the present invention detects opening and closing of sheet feed trays.

FIG. 7 is a flowchart showing an example process in which the image forming apparatus 4 detects opening and closing of a sheet feed tray. In the description below, a series of operations in which the user opens a sheet feed tray, sets paper sheets Sh in the sheet feed tray, and closes the sheet feed tray will be called "opening and closing of a (the) sheet feed tray".

First, the operation detector 441 of the image forming apparatus 4 determines whether opening and closing of a first sheet feed tray has been detected (S11). If the user has not opened and closed the first sheet feed tray, the operation detector 441 does not detect opening and closing of the sheet feed tray (NO in S11), and therefore, this process comes to an end.

If the user has opened and closed the first sheet feed tray for the media detection apparatus 2, on the other hand, the operation detector 441 detects the opening and closing of the sheet feed tray (YES in S11). Therefore, the operation detector 441 creates the sheet feed tray open/close information management table (see the explanatory diagram (3) in FIG. 5; however, simply referred to as the "open/close management table" in FIG. 7 and later) that stores the order in which the sheet feed trays were operated, and adds the detected sheet feed tray open/close information to the sheet feed tray open/close information management table (S12). The sheet feed tray open/close information management table can manage the open/close information about the sheet feed trays from which opening/closing has been detected, for example.

The operation detector 441 next determines whether opening and closing of second and subsequent sheet feed trays has been detected (S13). If the user has not opened and closed the second and subsequent sheet feed trays, the operation detector 441 does not detect opening and closing of any sheet feed tray (NO in S13), and therefore, this process comes to an end.

If the user has opened and closed the second sheet feed tray for the media detection apparatus 2, on the other hand, the operation detector 441 detects the opening and closing of the sheet feed tray (YES in S13). Therefore, the operation detector 441 sequentially adds the detected sheet feed tray open/close information to the sheet feed tray open/close information management table created in step S12 (S14). The process then returns to step S13. If there is a third or subsequent sheet feed tray that has been opened and closed, the operation detector 441 repeats the process of adding the sheet feed tray open/close information to the sheet feed tray open/close information management table, in accordance with the opening and closing of the sheet feed tray detected by the operation detector 441.

In FIG. 7, sheet feed trays are added to the sheet feed tray open/close information management table in order of opening and closing of the sheet feed trays one by one. However, the user sometimes opens a plurality of sheet feed trays, sets paper sheets Sh in each of the sheet feed trays, and then sequentially closes the sheet feed trays. In this case, the sheet feed trays may be added to the sheet feed tray open/close information management table in order of closing.

The explanatory diagram (3) in FIG. 5 shows an example configuration of the sheet feed tray open/close information management table (an example of a second table) created by the image forming apparatus 4.

The timing at which the sheet feed tray open/close information management table is created in step S12 in FIG. 7 is before the job is executed, for example. Although the sheet feed tray open/close information management table is deleted after the job is executed, it may be associated with the job and be saved in the memory 442.

The sheet feed tray open/close information management table is formed with a number field and a sheet feed tray number field.

In the number field, the order in which the sheet feed trays opened and closed by the user have been detected by the operation detector 441 (which is the order in which the sheet feed trays were opened and closed) is stored.

In the sheet feed tray number field, the names of the sheet feed trays from which the operation detector 441 has detected opening and closing are stored. This example indicates that the user opened and closed the sheet feed trays in the order of the sheet feed tray 1, the sheet feed tray 2, the sheet feed tray 3, and the sheet feed tray 4, and set paper sheets Sh in the sheet feed trays. Here, the sheet profiles of the paper sheets Sh set in the sheet feed trays 1 and 2 are different (media A and B), but the sheet profiles of the paper sheets Sh set in the sheet feed trays 3 and 4 are the same media C.

The order of operation (opening and closing) of the sheet feed trays stored in the sheet feed tray open/close information management table is the order in which the sheet feed trays were closed after they were opened. However, paper sheets Sh of different sheet types might be set in different sheet feed trays, with a plurality of sheet feed trays being open. Therefore, the order in which the sheet feed trays were operated (opened and closed) may be the order in which the sheet feed trays opened beforehand were closed.

<Example Process of Setting Sheet Information on Sheet Feed Trays>

Figure 8:
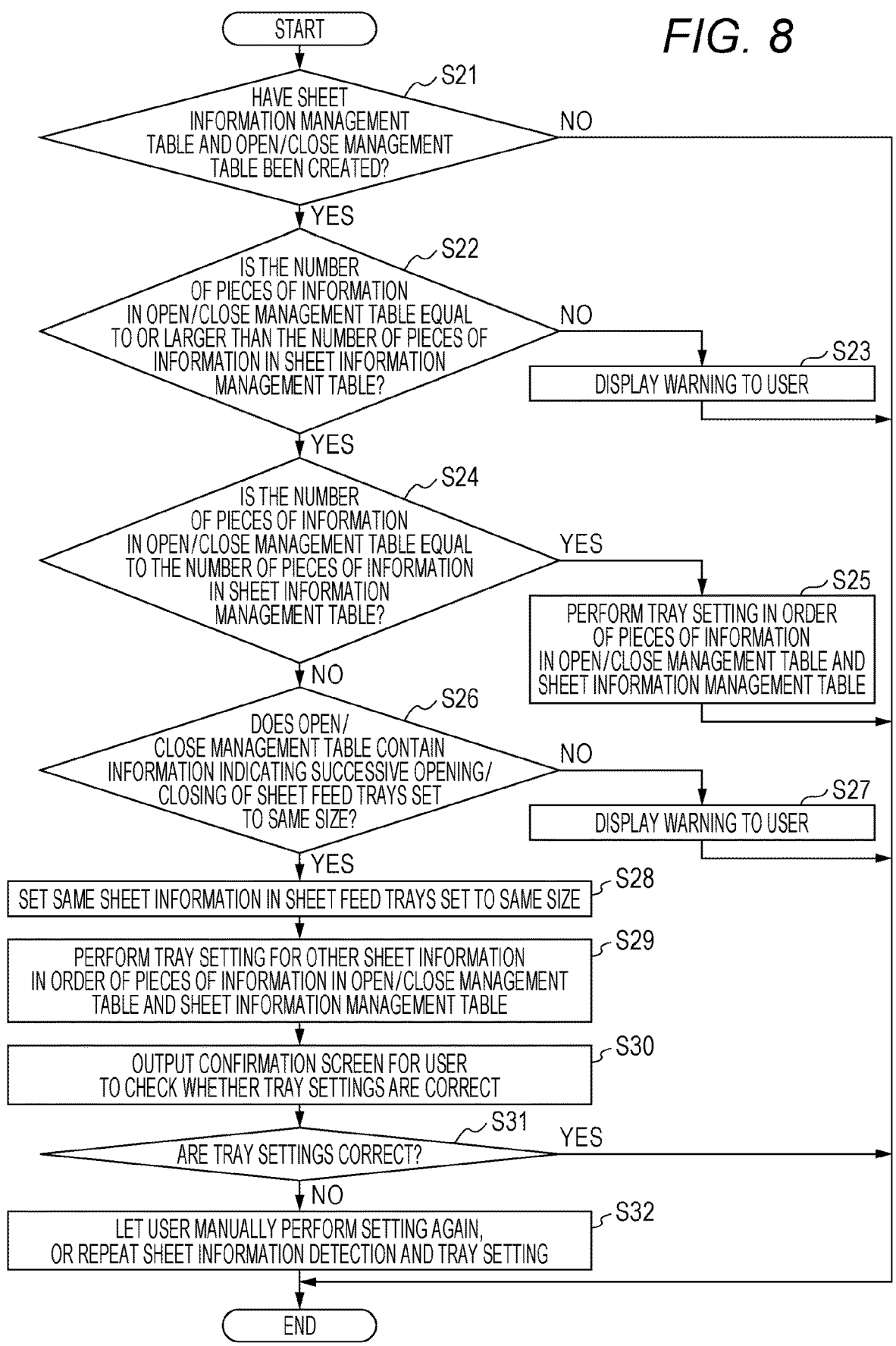
FIG. 8 is a flowchart showing an example process in which the image forming apparatus according to the first embodiment of the present invention sets sheet information on sheet feed trays.

Next, a process in which the controller 420 of the image forming apparatus 4 sets sheet information on the sheet feed trays so that the order of the sheet information stored in the sheet information management table matches the order of the sheet feed trays stored in the sheet feed tray open/close information management table is described, with reference to FIG. 8.

FIG. 8 is a flowchart showing an example process in which the image forming apparatus 4 sets sheet information on the sheet feed trays.

FIG. 8 illustrates a process in which the controller 420 compares the number of pieces of sheet information stored in the sheet information management table with the number of sheet feed trays stored in the sheet feed tray open/close information management table, and changes the sheet information to be set on the sheet feed trays, depending on whether the number of sheet feed trays is equal to or larger than the number of pieces of sheet information, or whether the number of sheet feed trays is smaller than the number of pieces of sheet information.

First, the controller 420 of the image forming apparatus 4 determines whether the sheet information management table and the sheet feed tray open/close information management table (written simply as "open/close management table" in the drawing) have been created before the start of a job (S21). Here, the controller 420 inquires of the media detection apparatus 2 about creation of the sheet information management table, and determines whether the sheet information management table has been created. The controller 420 also determines whether the sheet feed tray open/close information management table has been created, by referring to the memory 442.

If the sheet information management table or the sheet feed tray open/close information management table has not been created (NO in S21), this process comes to an end. If the sheet information management table and the sheet feed tray open/close information management table have been created (YES in S21), on the other hand, the controller 420 receives the sheet information management table from the media detection apparatus 2.

The controller 420 next determines whether the number of pieces of information (the number of records) in the sheet feed tray open/close information management table is equal to or greater than the number of pieces of information (the number of records) in the sheet information management table (S22). If the number of sheet feed trays stored in the sheet feed tray open/close information management table is smaller than the number of pieces of sheet information stored in the sheet information management table (NO in S22), the number of sheet types of the paper sheets Sh to be stored in the sheet feed trays is larger than the number of sheet feed trays that have been opened and closed, and therefore, not all the paper sheets Sh can be stored in the sheet feed trays. Therefore, the controller 420 displays a warning to the user (S23), and ends this process. This warning is displayed as a message indicating that the number of sheet types of the paper sheets Sh to be stored in the sheet feed trays differs from the number of sheet feed trays that have been opened and closed, for example, on the operation display 407.

If the number of pieces of information in the sheet feed tray open/close information management table is equal to or larger than the number of pieces of information in the sheet information management table (YES in S22), on the other hand, the controller 420 determines whether the number of pieces of information in the sheet feed tray open/close information management table is the same as the number of pieces of information in the sheet information management table (S24). If the number of pieces of information in the sheet feed tray open/close information management table is the same as the number of pieces of information in the sheet information management table (YES in S24), the controller 420 performs tray setting in order of storing of information into the sheet feed tray open/close information management table and the sheet information management table (this order will be hereinafter referred to as "order of pieces of information" in the flowchart) (S25). That is, in a case where the number of sheet feed trays detected by the operation detector 441 is the same as the number of pieces of sheet information, the controller 420 sets the sheet information stored in the sheet feed tray open/close information management table in order of storing of the sheet feed trays into the sheet information management table, and then ends this process.

The explanatory diagram (4) in FIG. 5 is now described.

The explanatory diagram (4) in FIG. 5 shows an example configuration of a confirmation screen displayed on the image forming apparatus 4.

On this confirmation screen, the sheet information (such as sheet profiles and sheet sizes, for example) associated with the tray numbers are displayed in conjunction with the tray numbers of the sheet feed trays in which paper sheets Sh are set. For example, the confirmation screen shows that paper sheets Sh of the media A are set in the sheet feed tray 1, paper sheets Sh of the media B are set in the sheet feed tray 2, and paper sheets Sh of the media C are set in the sheet feed tray 3. In a case where tray setting is performed in step S25 in FIG. 8, only the information about the sheet feed trays 1 to 3 is displayed on the confirmation screen. The confirmation screen showing that the media C is set in the sheet feed tray 4 is an example display screen that will be output in step S30 described later.

For example, if sheet feed tray numbers are stored up to Number 3 in the sheet feed tray open/close information management table shown in the explanatory diagram (3) in FIG. 5, the number of the sheet feed trays is the same as the number of pieces of information in the sheet information management table shown in the explanatory diagram (2) in FIG. 5. Therefore, on the tray setting screen shown in the explanatory diagram (4) in FIG. 5, the media A, B, and C are set as the sheet profiles for the sheet feed trays 1, 2, and 3 as the tray numbers.

If the number of pieces of information in the sheet feed tray open/close information management table is not the same as the number of pieces of information in the sheet information management table in step S24 (NO in S24), on the other hand, the controller 420 determines whether the sheet feed tray open/close information management table contains information indicating that sheet feed trays set at the same size have been opened and closed in a row (S26).

For example, if the sheet feed tray open/close information management table does not contain information indicating that sheet feed trays set at the same size have been opened and closed in a row (NO in S26), it is unclear which sheet feed trays in the sheet feed tray open/close information management table can be associated with the sheet information stored in the sheet information management table. Therefore, the controller 420 displays a warning to the user (S27), and ends this process. This warning is displayed as a message prompting the user to open and close the sheet feed trays again, because the number of sheet feed trays to be opened and closed is excessive, for example.

If the number of sheet feed trays stored in the sheet feed tray open/close information management table is larger than the number of pieces of sheet information stored in the sheet information management table, and a plurality of sheet feed trays from which paper sheets Sh of the same size have been detected by the size detector 308 and 435 is stored in the sheet feed tray open/close information management table, on the other hand, the controller 420 sets the same sheet information on a plurality of sheet feed trays. For example, if the controller 420 determines in step S26 that the sheet feed tray open/close information management table contains information indicating that sheet feed trays set at the same size have been opened and closed in a row (YES in S26), the controller 420 sets the same sheet information on the sheet feed trays set at the same size (S28). For example, if automatic sheet feed tray switch (ATS) setting has been performed on the sheet feed trays 3 and 4, the controller 420 can set the same sheet information (media C) on the sheet feed trays 3 and 4.

The ATS setting is an automatic switch function to be executed in a case where the paper sheets Sh set in one sheet feed tray run out during execution of a job. This automatic switch function enables switching to another sheet feed tray, and supply of the paper sheets Sh set in another sheet feed tray without stopping the job. For example, as shown in the explanatory diagram (3) in FIG. 5, sheet feed tray numbers up to Number 4 are stored in the sheet feed tray open/close information management table, and the ATS setting has been performed on the sheet feed trays 3 and 4. In this case, on the tray setting screen shown in the explanatory diagram (4) in FIG. 5, the same sheet profile, or the media C, is set in the sheet feed trays 3 and 4 as the tray numbers. Accordingly, even if the paper sheets in the sheet feed tray 3 run out during job execution, the sheet feeder 304 can feed paper sheets Sh from the sheet feed tray 4 without stopping the job. Thus, the controller 420 can set the same sheet information as the sheet information set on the one sheet feed tray, for the other sheet feed trays on which the ATS setting has been performed.

Referring back to FIG. 8, explanation of the process to be performed by the controller 420 is continued. The controller 420 performs tray setting with other sheet information (sheet information yet to be set on the sheet feed trays) on the sheet feed trays in the order in which information was stored into the sheet feed tray open/close information management table and the sheet information management table (S29). The controller 420 outputs a confirmation screen (see explanatory diagram (4) in FIG. 5) for the user to check whether the tray settings are correct, to the operation display 407 (S30). In this manner, in a case where the number of pieces of sheet information stored in the sheet information management table and the number of sheet feed trays stored in the sheet feed tray open/close information management table are different, the controller 420 can cause the operation display 407 to display the confirmation screen showing the sheet information automatically set on the sheet feed trays. This confirmation screen may be displayed on the operation display 407, after tray setting is performed in step S25.

The user looks at the confirmation screen and determines whether the tray settings are correct (S31). If the user determines that the tray settings are correct (YES in S31), this process comes to an end, and a job execution start instruction is issued. If the user determines that the tray settings are incorrect (NO in S31), on the other hand, tray setting is manually performed again. Alternatively, the sheet information detection performed by the media detection apparatus 2, and the tray setting performed by the controller 420 are redone (S32). After that, this process is performed again from step S21.

In the image forming system 1 according to the first embodiment described above, sheet information is stored into the sheet information management table in the order in which the user caused the media detection apparatus 2 to detect the sheet information about paper sheets Sh. Further, as the user sets paper sheets Sh in the sheet feed trays, sheet feed tray open/close information is stored into the sheet feed tray open/close information management table in the order in which the sheet feed trays are opened and closed. The sheet information is then set on the sheet feed trays, on the basis of the number of pieces of sheet information stored in the sheet information management table and the number of pieces of sheet feed tray open/close information stored in the sheet feed tray open/close information management table. That is, after the offline media detection apparatus 2 disposed outside the image forming apparatus 4 detects the sheet information, the sheet information detected by the media detection apparatus 2 is set on the sheet feed trays in which paper sheets Sh are set.

Accordingly, the user simply has to perform an operation to cause the media detection apparatus 2 to successively detect the sheet information about a plurality of types of paper sheets Sh, and then successively set paper sheets Sh of the different types in different sheet feed trays. In this manner, the sheet information is set on the sheet feed trays without fail. As a result, it is no longer necessary to set sheet information every time paper sheets Sh are set in a sheet feed tray as in conventional cases, and the user can avoid the trouble of setting the sheet information on the sheet feed trays.

Further, if the sheet feed trays has been subjected to ATS setting, the same sheet information is automatically set on a plurality of sheet feed trays subjected to ATS setting. Thus, the user does not have to repeatedly set the same sheet information on a plurality of sheet feed trays.

Modifications of the First Embodiment

There are cases where the user causes the media detection apparatus 2 to detect sheet information in the wrong order, or opens and closes the sheet feed trays in the wrong order. In such cases, the user may be enabled to change the order of the sheet feed trays or delete a sheet feed tray by controlling the tray numbers in the explanatory diagram (4) in FIG. 5.

Further, the sheet information management table and the sheet feed tray open/close information management table described above are created before execution of a job, and are deleted after execution of the job. However, the sheet information management table and the sheet feed tray open/close information management table may be stored in a non-volatile recording device such as an HDD. When the user uses the same job as a job executed in accordance with an instruction in the past, the sheet information management table and the sheet feed tray open/close information management table may be read from the non-volatile recording device, and these tables may be reused. In this case, even if the order in which the user causes the media detection apparatus 2 to detect the sheet information and the order in which the sheet feed trays are opened and closed in the current job execution are different from the order in the past, the controller 420 can correctly set the sheet information on the sheet feed trays.

Second Embodiment

Next, an image forming system according to a second embodiment of the present invention is described. An image forming system according to the second embodiment characteristically collects market data including sheet information and sheet feed tray open/close information from an image forming apparatus, and recommend a specific sheet feed tray in accordance with the sheet information about a certain paper sheet Sh.

<Example Functional Configurations of a Media Detection Apparatus, an Image Forming Apparatus, and a Learning Apparatus>

Figure 9:
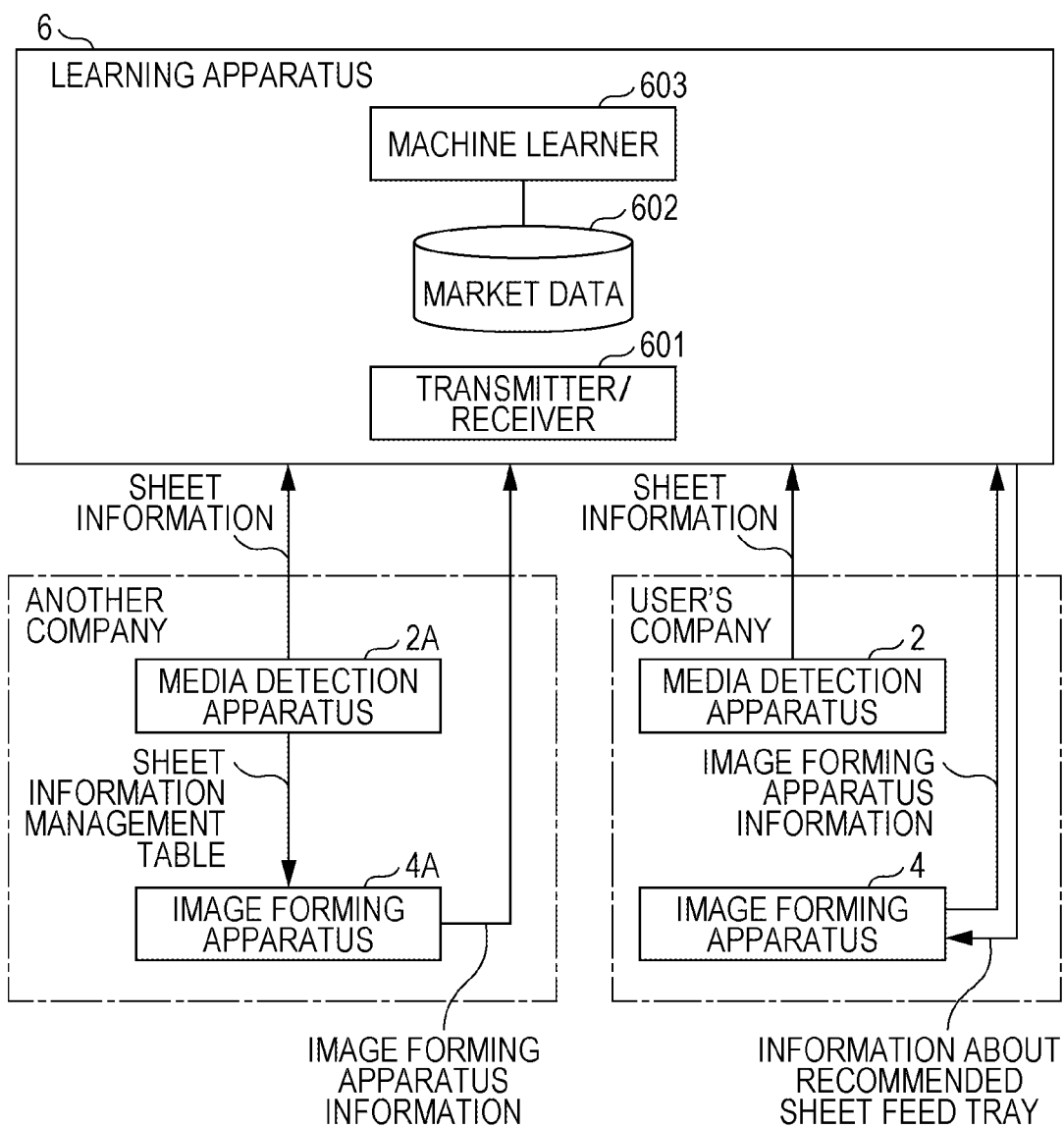
FIG. 9 is a diagram showing an example overall configuration of an image forming system according to a second embodiment of the present invention.

FIG. 9 is a diagram showing an example overall configuration of an image forming system 1A. In FIG. 9, the blocks necessary for explaining processing according to this embodiment are extracted as in FIG. 4, and the relationship between a media detection apparatus 2, image forming apparatuses 4 and 4A, and a learning apparatus 6 is shown in an easy-to-understand manner.

The image forming system 1A according to the second embodiment includes the media detection apparatus 2 and the image forming apparatus 4 of the user's company, a media detection apparatus 2A (an example of a second recording material information detecting apparatus) and the image forming apparatus 4A (an example of a second image forming apparatus) of another company, and the learning apparatus 6. The configuration of the media detection apparatus 2A is the same as the configuration of the media detection apparatus 2 shown in FIG. 4. Likewise, the configuration of the image forming apparatus 4A is the same as that of the image forming apparatus 4 shown in FIG. 4. Therefore, in FIG. 9, each apparatus is shown in a simplified manner.

In this example, the transmitters 222 of the media detection apparatuses 2 and 2A are formed with communication interfaces that can be connected to a LAN, for example, and are capable of transmitting sheet information from the LAN to the learning apparatus 6 via the Internet or the like.

The transmitters/receivers 443 (see FIG. 4) of the image forming apparatuses 4 and 4A are formed with communication interfaces that can be connected to a LAN, for example, and are capable of transmitting information about the sheet feed trays and information about the image forming apparatuses 4 and 4A (referred to as "image forming apparatus information" in the drawing) to the learning apparatus 6 from the LAN via the Internet or the like.

The transmitters/receivers 443 are also capable of receiving information about the sheet feed tray recommended by the learning apparatus 6 in accordance with sheet information. The image forming apparatus information includes information indicating what kind of paper sheet Sh is fed when a jam occurs, and operating information about the image forming apparatuses 4 and 4A, for example.

The learning apparatus 6 includes a transmitter/receiver 601, a market database 602, and a machine learner 603.

From the media detection apparatus 2A of another company, the transmitter/receiver 601 receives the sheet information about a paper sheet Sh detected by the media detection apparatus 2A. From the image forming apparatus 4A of another company, the transmitter/receiver 601 also receives sheet feed tray information that has been set in accordance with the sheet information detected by the media detection apparatus 2A, and information about the image forming apparatus 4A.

From the media detection apparatus 2 of the user's company, the transmitter/receiver 601 also receives the sheet information about a paper sheet Sh detected by the media detection apparatus 2. From the image forming apparatus 4 of the user's company, the transmitter/receiver 601 also receives information about sheet feed tray information and information about the image forming apparatus 4. Further, the transmitter/receiver 601 transmits information about the sheet feed tray recommended in accordance with the sheet information detected by the media detection apparatus 2, to the image forming apparatus 4 of the user's company.

The market database 602 collectively stores the sheet information received by the transmitter/receiver 601, the sheet feed tray information received from the image forming apparatuses 4 and 4A, and the information about the image forming apparatuses 4 and 4A, as market data. The targets of the market data are the media detection apparatuses 2 and the image forming apparatuses 4 operating in many companies.

The machine learner 603 acquires, from the image forming apparatus 4A of another company, sheet information (an example of second sheet information) set on a sheet feed tray of the image forming apparatus 4A, and machine-learns the sheet feed tray (an example of a second recording material supplier) on which this sheet information is set. Therefore, the machine learner 603 reads the market data from the market database 602, and learns the environment and usage in which the image forming apparatus 4A is used, the tendency of the sheet feed tray that has been set in accordance with the sheet information, and the like. For example, the machine learner 603 calculates the jam rate for each of the sheet feed trays on which certain sheet information is set, in the image forming apparatus 4A of another company.

The machine learner 603 then acquires the sheet information detected from a paper sheet Sh by the media detection apparatus 2 provided for the image forming apparatus 4 of the user's company, and recommends the information about a sheet feed tray of the image forming apparatus 4 on which this sheet information can be set, to the image forming apparatus 4. In doing so, the machine learner 603 can recommend the sheet feed tray having the lowest jam rate to the user. The image forming apparatus 4 then sets the sheet information detected by the media detection apparatus 2 on the sheet feed tray recommended by the machine learner 603.

Next, an example process to be performed in the image forming system 1A is described.

Figure 10:
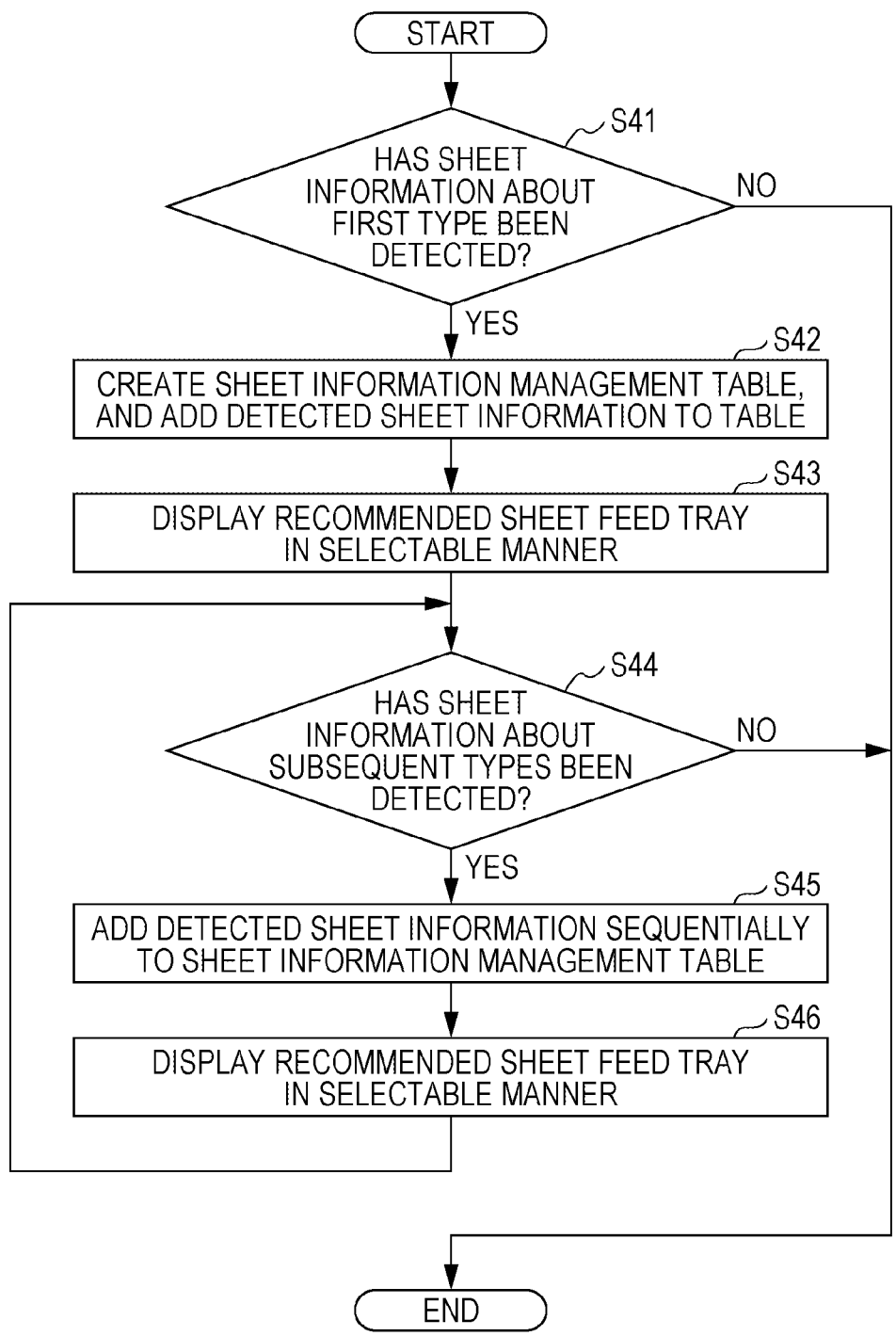
FIG. 10 is a flowchart showing an example process to be performed by an image forming system according to a second embodiment of the present invention.

FIG. 10 is a flowchart showing an example process to be performed in the image forming system 1A.

First, the sheet information detector 202 (see FIG. 4) of the media detection apparatus 2 of the user's company determines whether the sheet information about paper sheets Sh of a first type has been detected (S41). If the user has not inserted a paper sheet Sh of the first type into the media detection apparatus 2, the sheet information detector 202 does not detect the sheet information (NO in S41), and therefore, this process comes to an end.

If the user has inserted a paper sheet Sh of the first type into the media detection apparatus 2, the sheet information detector 202 detects the sheet information about the paper sheet Sh (YES in S41). Therefore, the sheet information detector 202 creates a sheet information management table for storing the sheet information, and adds the detected sheet information about the paper sheet Sh to the sheet information management table (S42).

The media detection apparatus 2 next transmits the detected sheet information about the paper sheet Sh to the learning apparatus 6. The machine learner 603 of the learning apparatus 6 transmits information about the sheet feed tray recommended in accordance with the sheet information received from the media detection apparatus 2, to the image forming apparatus 4. The information about the recommended sheet feed tray is then displayed on the operation display 407 of the image forming apparatus 4 (S43).

The sheet information detector 202 next determines whether the sheet information about paper sheets Sh of second and subsequent types has been detected (S44). If the user has not inserted any paper sheet Sh of the second and subsequent types into the media detection apparatus 2, the sheet information detector 202 does not detect the sheet information (NO in S44), and therefore, this process comes to an end. In this case, the user opens and closes the sheet feed tray on the basis of the information about the recommended sheet feed tray displayed on the operation display 407 in step S43, and thus, the sheet information is set on the sheet feed tray.

If the user has inserted a paper sheet Sh of the second type into the media detection apparatus 2 in step S44, the sheet information detector 202 detects the sheet information about the paper sheet Sh (YES in S44). Therefore, the sheet information detector 202 sequentially adds the detected sheet information to the sheet information management table created in step S42 (S45).

The media detection apparatus 2 next transmits the detected sheet information about the paper sheet Sh of the second type to the learning apparatus 6. The machine learner 603 transmits information about the sheet feed tray recommended in accordance with the sheet information received from the media detection apparatus 2, to the image forming apparatus 4. The information about the sheet feed tray recommended in accordance with the sheet information about the paper sheet Sh of the second type is then displayed on the operation display 407 of the image forming apparatus 4 (S46).

The process then returns to step S44, and, when a paper sheet Sh of a third or subsequent type is inserted, the sheet information detector 202 repeats the process of adding the detected sheet information to the sheet information management table.

After that, the processes shown in FIGS. 7 and 8 according to the first embodiment are performed.

By the process shown in FIG. 10, the sheet feed tray 2 is displayed as the recommended sheet feed tray on the operation display 407 in step S43, for example, and the sheet feed tray 3 is displayed on the operation display 407 in step S45, for example.

Therefore, when the user sets paper sheets Sh in the sheet feed tray 2 recommended in accordance with a paper sheet Sh of the first type, the sheet feed tray open/close information management table is created as described above with reference to FIG. 7, and the sheet feed tray open/close information is registered therein. When the user next sets paper sheets Sh in the sheet feed tray 3 recommended in accordance with a paper sheet Sh of the second type, the sheet feed tray open/close information is registered in the already created sheet feed tray open/close information management table.

After that, as described above with reference to FIG. 8, the sheet information management table and the sheet feed tray open/close information management table are compared with each other, the sheet information about the paper sheet Sh of the first type is set on the sheet feed tray 2, and the sheet information about the paper sheet Sh of the second type is set on the sheet feed tray 3.

In the image forming system 1A according to the second embodiment described above, the machine learner 603 recommends a sheet feed tray in which paper sheets Sh can be set, in accordance with sheet information detected by the media detection apparatus 2 of the user's company. Accordingly, to cope with situations where paper sheets Sh of a wide variety of sheet types are used, an appropriate sheet feed tray is recommended to the image forming apparatus 4, in accordance with the sheet information about the paper sheets Sh set in the sheet feed trays in the image forming apparatus 4A of another company, and information about the sheet feed trays of the image forming apparatus 4 of the user's company. As a result, the occurrence of paper jams and the like can be reduced.

Although apparatuses in the user's company and another company have been described with reference to FIG. 9, the media detection apparatus 2A installed in a company or a usage environment may be referred to as another apparatus, and the media detection apparatus 2 may be referred to as the user's apparatus.

Further, although the image forming system 1A includes the learning apparatus 6, the image forming apparatus 4 may include the market database 602 and the machine learner 603. In that case, the machine learner 603 of the image forming apparatus 4 may perform machine learning on the basis of the operations performed in the past, sheet feed tray information received from another image forming apparatus 4A installed in the company, or information about the image forming apparatus 4. In this manner, the machine learner 603 may be enabled to provide the image forming apparatus 4, which is to execute the current job, with information about the sheet feed tray recommended to the user's apparatus.

Third Embodiment

Next, an image forming system according to a third embodiment of the present invention is described. In an image forming system according to the third embodiment, an information processing apparatus disposed between a media detection apparatus and an image forming apparatus characteristically manages sheet information and sheet feed tray open/close information.

<Example Functional Configurations of a Media Detection Apparatus, an Image Forming Apparatus, and a Learning Apparatus>

Figure 11:
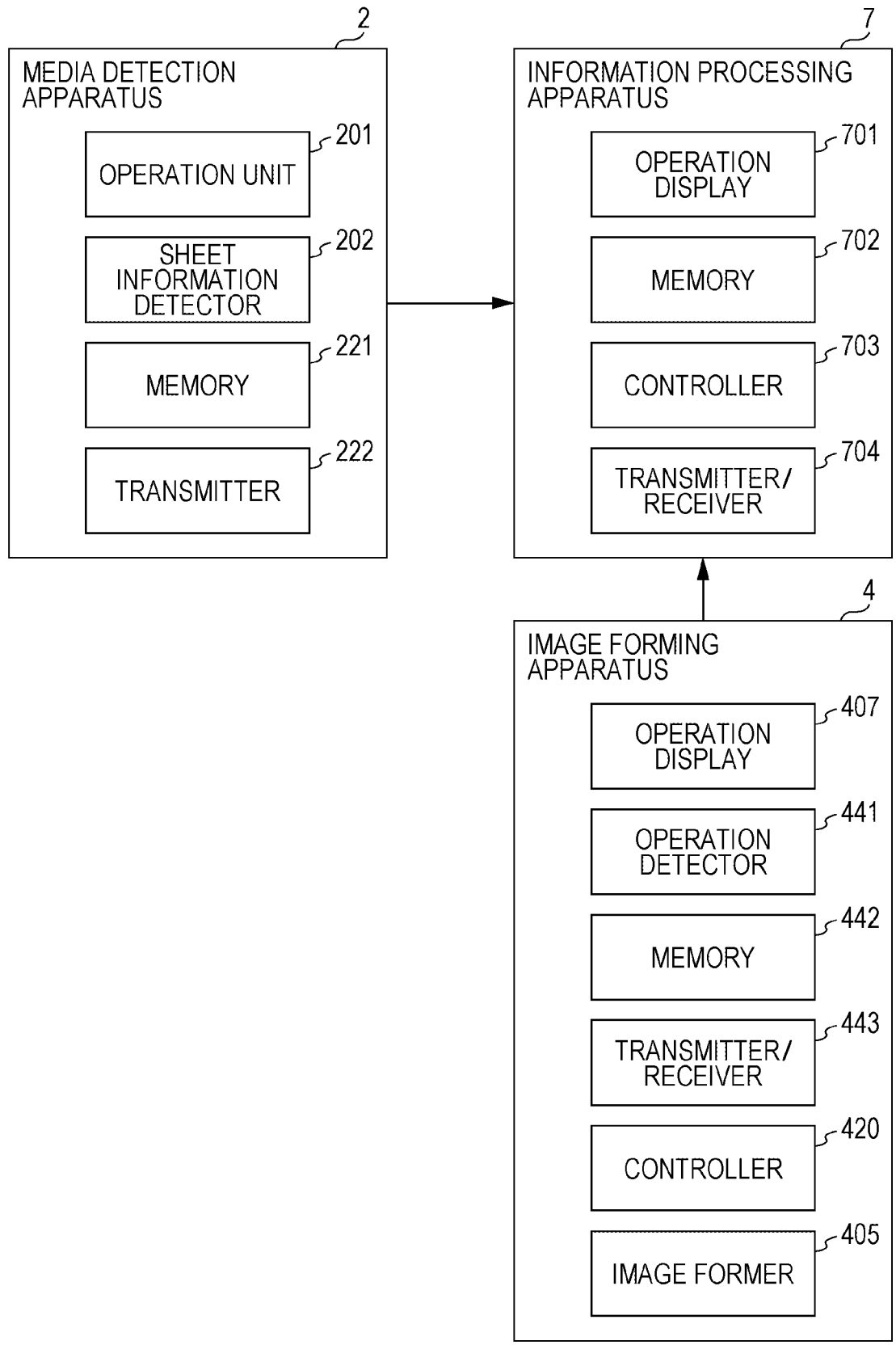
FIG. 11 is a diagram showing an example overall configuration of an image forming system according to a third embodiment of the present invention.

FIG. 11 is a diagram showing an example overall configuration of an image forming system 1B. In FIG. 11, the blocks necessary for explaining processing according to this embodiment are extracted as in FIG. 4, and the relationship between a media detection apparatus 2, an image forming apparatus 4, and an information processing apparatus 7 is shown in an easy-to-understand manner. Since the configurations of the media detection apparatus 2 and the image forming apparatus 4 have already been described above with reference to FIG. 4, an example internal configuration of the information processing apparatus 7 is described below.

The information processing apparatus 7 is formed with a personal computer or the like that is operated by the user, and can communicate with the media detection apparatus 2 and the image forming apparatus 4. This information processing apparatus 7 includes an operation display 701, a memory 702, a controller 703, and a transmitter/receiver 704.

The operation display 701 is formed with a touch panel display device, for example, and the user can input an operation and check the information displayed on the screen.

The memory 702 (an example of a second memory) is formed with a memory device such as a ROM, a RAM, or HDD, for example, and associates sheet information acquired from the media detection apparatus 2 with sheet feed tray open/close information acquired from the image forming apparatus 4 before saving these pieces of information. At this stage, a table in which sheet information is set on the sheet feed trays that have been opened and closed is stored into the memory 702, as described above with reference to the explanatory diagram (4) in FIG. 5.

The controller 703 (an example of a second controller) is formed with a CPU, for example, and controls operations of the respective components in the information processing apparatus 7. The process to be performed by the controller 703 is the same as the process to be performed by the controller 420 according to the first embodiment. That is, the controller 703 acquires the sheet information management table and the open/close information management table shown in FIG. 5.

The controller 703 then causes the memory 702 to store the sheet information associated with the respective sheet feed trays from which operations have been detected, in the order in which operations performed on the sheet feed trays supplying paper sheets Sh to the image former 405 were detected by the operation detector 441 of the image forming apparatus 4, in accordance with the order in which a plurality of pieces of sheet information was detected by the sheet information detector 202 of the media detection apparatus 2 disposed outside the image forming apparatus 4. At this stage, the controller 703 performs the process shown in FIG. 8, sets the sheet information on the sheet feed trays that have been opened and closed, and stores the sheet information into the memory 702.

The controller 703 also causes the operation display 701 to display the screen shown in the explanatory diagram (4) in FIG. 5. The user can check whether the sheet feed tray settings are correct, by looking at the confirmation screen displayed on the operation display 701 of the information processing apparatus 7.

The transmitter/receiver 704 receives sheet information from the media detection apparatus 2, and receives open/close information about the sheet feed trays of the large-capacity sheet feed apparatuses 3 and 3A, information indicating that paper sheets Sh are set in the sheet feed trays, and the like from the image forming apparatus 4.

In the image forming system 1B according to the third embodiment described above, the information processing apparatus 7 connected to the media detection apparatus 2 sets sheet information on sheet feed trays, on the basis of the sheet information acquired from the media detection apparatus 2 and sheet feed tray open/close information acquired from the image forming apparatus 4. As the image forming system 1B is designed in this manner, sheet information is set on the sheet feed trays even if the media detection apparatus 2 and the image forming apparatus 4 are not connected to each other.

It is to be understood that the present invention is not limited to each of the above described embodiments, and various other applications and modifications can of course be made to them without departing from the scope of the present invention as set forth in the claims.

For example, for easier understanding of the present invention, the configurations of apparatuses and systems have been specifically and explicitly described in each of the above embodiments. However, not all the components described above should be included in an apparatus or a system. It is also possible to replace some of the components of the embodiments described herein with components of some other embodiment, and furthermore, it is possible to add components of some other embodiment to the components of one of the embodiments described above. It is also possible to add, delete, or replace some of the components of each of the above embodiments to/from/with other components.

Further, the control lines and the information lines shown in the drawings are ones necessary for the explanation, but not all the control lines and all the information lines in the products are shown. In practice, it can be considered that almost all the components are connected to one another.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:
   an image forming apparatus; and
   a recording material information detecting apparatus provided outside the image forming apparatus,
   wherein
   the recording material information detecting apparatus includes
   a recording material information detector that detects recording material information about a recording material, and
   the image forming apparatus includes:
   an image former that forms an image on the recording material;
   an operation detector that detects an operation performed on a recording material supplier that supplies the recording material to the image former;
   a memory; and
   a hardware processor that causes the memory to store the recording material information set and associated with each recording material supplier of a plurality of the recording material suppliers from which the operation has been detected, in an order in which the operation detector has detected the operation performed on the plurality of the recording material suppliers, in accordance with an order in which the recording material information detector has detected a plurality of pieces of the recording material information.

2. The image forming system according to claim 1, wherein
   the memory stores:
   a first table that stores a plurality of pieces of the recording material information collectively detected from a plurality of the recording materials at a predetermined timing by the recording material information detector, in the order in which the recording material information detector has detected the plurality of pieces of the recording material information; and
   a second table that stores an order in which the recording material suppliers were operated, and
   the hardware processor sets the recording material information on the recording material suppliers, to match the order of the recording material information stored in the first table with the order of the recording material suppliers stored in the second table.

3. The image forming system according to claim 2, wherein
   the predetermined timing is before a job is executed by the image former to form an image on the recording material, and the recording material information detected by the recording material information detector within a predetermined time from the predetermined timing is stored in the first table.

4. The image forming system according to claim 2, wherein
the hardware processor is capable of accepting a batch registration mode in which a plurality of pieces of the recording material information is collectively registered in a plurality of the recording material suppliers, and, when accepting the batch registration mode, sets the recording material information detected by the recording material information detector on the recording material suppliers detected by the operation detector.

5. The image forming system according to claim 2, wherein
the order in which the recording material suppliers were operated is an order in which the recording material suppliers were closed after opened, the second table storing the order.

6. The image forming system according to claim 5, wherein
the order in which the recording material suppliers were operated is an order in which the recording material suppliers in an open state were closed.

7. The image forming system according to claim 5, wherein
the hardware processor compares the number of pieces of the recording material information stored in the first table with the number of the recording material suppliers stored in the second table, and changes the recording material information to be set on the recording material suppliers, depending on whether the number of the recording material suppliers is equal to or larger than the number of pieces of the recording material information, or whether the number of the recording material suppliers is smaller than the number of pieces of the recording material information.

8. The image forming system according to claim 7, wherein,
when the number of the recording material suppliers detected by the operation detector is the same as the number of pieces of the recording material information, the hardware processor sets the recording material information stored in the first table, in the order in which the recording material suppliers were stored into the second table.

9. The image forming system according to claim 7, wherein,
when the number of the recording material suppliers stored in the second table is smaller than the number of pieces of the recording material information stored in the first table, the hardware processor outputs a warning.

10. The image forming system according to claim 7, wherein
the recording material supplier includes a size detector that detects a size of the recording material to be set in the recording material supplier, and,
when the number of the recording material suppliers stored in the second table is larger than the number of pieces of the recording material information stored in the first table, and a plurality of the recording material suppliers for which the size detector has detected the same size of the recording material is stored in the second table, the hardware processor sets the same recording material information on the plurality of the recording material suppliers.

11. The image forming system according to claim 10, wherein,
when the recording material set in one of the recording material suppliers runs out during execution of a job, the hardware processor switches to another one of the recording material suppliers, and sets the same recording material information as the recording material information set on the one of the recording material suppliers on the another one of the recording material suppliers, the another one of the recording material suppliers having an automatic switching function that supplies the recording material set in another one of the recording material suppliers without stopping the job.

12. The image forming system according to claim 7, wherein
the image forming apparatus includes a display, and,
when the number of pieces of the recording material information stored in the first table differs from the number of the recording material suppliers stored in the second table, the hardware processor causes the display to display a confirmation screen indicating the recording material information automatically set on the recording material suppliers.

13. The image forming system according to claim 7, further comprising
a machine learner that acquires second recording material information set on a second recording material supplier provided in a second image forming apparatus, and machine-learns the second recording material supplier on which the second recording material information is set, the second recording material information being acquired from the second image forming apparatus,
wherein the machine learner acquires the recording material information detected by the recording material information detecting apparatus provided for the image forming apparatus, and recommends, to the image forming apparatus, information about the recording material supplier on which the acquired recording material information can be set, the recording material supplier being provided in the image forming apparatus.

14. The image forming system according to claim 13, wherein
the image forming apparatus sets the recording material information detected by the recording material information detecting apparatus, on the recording material supplier recommended by the machine learner.

15. The image forming system according to claim 1, wherein
the recording material information includes a physical property value of the recording material, or information about a type of the recording material.

16. An image forming apparatus comprising:
an image former that forms an image on a recording material;
an operation detector that detects an operation performed on a recording material supplier that supplies the recording material to the image former;
a memory; and
a hardware processor that causes the memory to store recording material information set and associated with each recording material supplier of a plurality of the recording material suppliers from which the operation has been detected, in an order in which the operation detector has detected the operation performed on the plurality of the recording material suppliers, in accordance with an order in which a recording material information detector of a recording material information detecting apparatus provided outside the image forming apparatus has detected a plurality of pieces of the recording material information.

17. An information processing apparatus that is connected to an image forming apparatus including an image former that forms an image on a recording material, and to a recording material information detecting apparatus provided outside the image forming apparatus, the information processing apparatus comprising:

a second memory; and a second hardware processor that causes the second memory to store recording material information set and associated with each recording material supplier of a plurality of recording material suppliers from which an operation has been detected, in an order in which an operation detector of the image forming apparatus has detected the operation performed on the plurality of the recording material suppliers that supply the recording material to the image former, in accordance with an order in which a recording material information detector of the recording material information detecting apparatus provided outside the image forming apparatus has detected a plurality of pieces of the recording material information.

* * * * *